US011768520B2

(12) United States Patent
Kim et al.

(10) Patent No.: US 11,768,520 B2
(45) Date of Patent: Sep. 26, 2023

(54) FOLDABLE WINDOW, DISPLAY DEVICE INCLUDING THE SAME, AND A METHOD OF MANUFACTURING THE WINDOW

(71) Applicant: Samsung Display Co., Ltd., Yongin-Si (KR)

(72) Inventors: Sunghoon Kim, Asan-si (KR); Yuri Kim, Guri-si (KR); Kang-Woo Lee, Seoul (KR); Seongjin Hwang, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 31 days.

(21) Appl. No.: 17/672,919

(22) Filed: Feb. 16, 2022

(65) Prior Publication Data

US 2022/0374046 A1  Nov. 24, 2022

(30) Foreign Application Priority Data

May 20, 2021  (KR) .......................... 10-2021-0065003

(51) Int. Cl.
*G06F 1/16* (2006.01)
*H04M 1/02* (2006.01)

(52) U.S. Cl.
CPC .......... *G06F 1/1652* (2013.01); *G06F 1/1641* (2013.01); *H04M 1/0268* (2013.01)

(58) Field of Classification Search
CPC ................................................. H04M 1/0268
See application file for complete search history.

(56) References Cited

U.S. PATENT DOCUMENTS 8,845,916 B2  9/2014 Shin
9,209,420 B2  12/2015 Han et al.
(Continued)

FOREIGN PATENT DOCUMENTS

KR  10-2008-0096158  10/2008
KR  10-0969473  7/2010
(Continued)

OTHER PUBLICATIONS

Sungil Kim et al., "Optimization of selective laser-induced etching (SLE) for fabrication of 3D glass microfluidic device with multi-layer micro channels", Micro and Nano Systems Letters vol. 7, No. 15 (2019) (https://doi.org/10.1186/s40486-019-0094-5), pp. 1-7.
(Continued)

*Primary Examiner* — Lisa Lea-Edmonds
(74) *Attorney, Agent, or Firm* — F. Chau & Associates, LLC

(57) ABSTRACT

A window includes: a substrate including a folding area, a non-folding area, an upper surface, and a lower surface, wherein the folding area is configured to fold about a folding axis; and a plurality of groove patterns arranged in the folding area along a first direction crossing the folding axis, wherein each of the plurality of groove patterns includes: a bottom surface recessed from the upper surface of the substrate and substantially parallel to the upper surface of the substrate; and a side surface, wherein each side surface of the plurality of groove patterns connects each bottom surface of the plurality of groove patterns to the upper surface of the substrate, and wherein the side surface includes at least one curved surface.

20 Claims, 32 Drawing Sheets

(56) References Cited

U.S. PATENT DOCUMENTS

| | | |
|---|---|---|
| 9,354,476 B2 | 5/2016 | Han et al. |
| 10,104,790 B2 * | 10/2018 | Lee .................. E05D 11/0054 |
| 10,314,184 B2 | 6/2019 | Choi et al. |
| 10,930,883 B2 * | 2/2021 | Park ...................... G06F 1/203 |
| 11,347,269 B2 * | 5/2022 | Yug .......................... G02B 1/12 |
| 11,409,325 B2 * | 8/2022 | Yee ...................... G06F 1/1637 |
| 11,550,365 B2 * | 1/2023 | Kim .................... H04M 1/0264 |
| 11,625,073 B2 * | 4/2023 | Shim .................... G06F 1/1616 |
| | | 361/679.28 |
| 2017/0155084 A1 * | 6/2017 | Park ...................... H10K 77/111 |
| 2018/0149793 A1 | 5/2018 | Gollier et al. |
| 2018/0329460 A1 * | 11/2018 | Song ...................... G06F 1/1626 |
| 2019/0131553 A1 * | 5/2019 | Park ........................ H10K 50/84 |
| 2019/0138059 A1 * | 5/2019 | Choi ...................... G06F 3/041 |
| 2020/0009691 A1 | 1/2020 | Ostholt et al. |
| 2020/0159369 A1 * | 5/2020 | Seo ...................... H10K 59/131 |
| 2021/0132740 A1 * | 5/2021 | Seo ........................ G06F 3/0448 |
| 2022/0011813 A1 | 1/2022 | Kim et al. |
| 2022/0043187 A1 * | 2/2022 | Choi .................. H04M 1/0216 |
| 2022/0098097 A1 * | 3/2022 | Lee .................... C03C 23/0075 |
| 2022/0256018 A1 * | 8/2022 | Kim .................. H04M 1/0216 |
| 2023/0006171 A1 * | 1/2023 | Choi .................... H10K 77/111 |
| 2023/0037245 A1 * | 2/2023 | Sim ...................... H05K 5/0217 |
| 2023/0044853 A1 * | 2/2023 | Park ...................... H04M 1/185 |
| 2023/0048213 A1 * | 2/2023 | Goo ...................... H10K 50/844 |
| 2023/0078056 A1 * | 3/2023 | Lee ........................ G06F 1/1641 |
| 2023/0126630 A1 * | 4/2023 | Park ...................... H05K 5/0017 |
| | | 257/40 |

FOREIGN PATENT DOCUMENTS

| | | |
|---|---|---|
| KR | 10-2015-0017819 | 2/2015 |
| KR | 10-2018-0008723 | 1/2018 |
| KR | 10-2019-0116378 | 10/2019 |
| KR | 10-2056314 | 12/2019 |
| KR | 10-2022-0006672 | 1/2022 |

OTHER PUBLICATIONS

Wansun Kim et al., Controlled multiple neutral planes by low elastic modulus adhesive for flexible organic photovoltaics, Nanotechnology 28 (2017) 194002 (9pp).

* cited by examiner

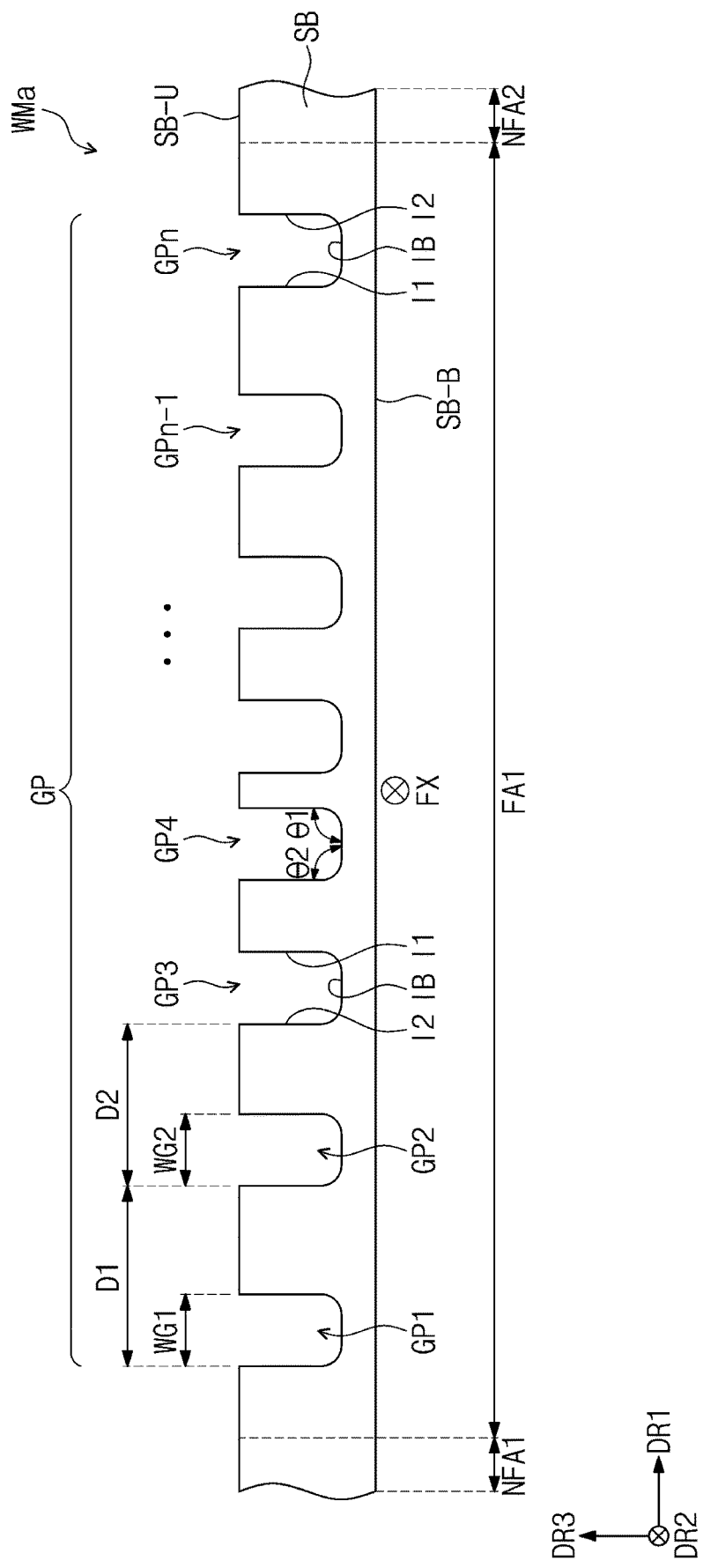

FOLDABLE WINDOW, DISPLAY DEVICE INCLUDING THE SAME, AND A METHOD OF MANUFACTURING THE WINDOW

CROSS-REFERENCE TO RELATED APPLICATION

This U.S. non-provisional patent application claims priority under 35 U.S.C. § 119 of Korean Patent Application No. 10-2021-0065003, filed on May 20, 2021, the disclosure of which is incorporated by reference herein in its entirety.

TECHNICAL FIELD

The present invention relates to a window, a display device including the window, and a method of manufacturing the same. More particularly, the present invention relates to a foldable window, a display device including the foldable window, and a method of manufacturing the foldable window.

DISCUSSION OF THE RELATED ART

A display device that provides images to a user is incorporated into various multimedia devices, such as a television set, a mobile phone, a tablet computer, a portable gaming console, etc. In recent years, various types of flexible display devices that are foldable or bendable are currently under development. Since the shape of the flexible display device is able to be changed in various configurations, e.g., being folded, rolled, or bent, the flexible display devices are becoming more portable.

Generally, the flexible display device includes a display panel and a window, which are foldable or bendable. However, the window of the flexible display device may be damaged due to a stress caused by a folding or bending operation and may be damaged by external impacts.

SUMMARY

According to an embodiment of the present invention, a window includes: a substrate including a folding area, a non-folding area, an upper surface, and a lower surface, wherein the folding area is configured to fold about a folding axis; and a plurality of groove patterns arranged in the folding area along a first direction crossing the folding axis, wherein each of the plurality of groove patterns includes: a bottom surface recessed from the upper surface of the substrate and substantially parallel to the upper surface of the substrate; and a side surface, wherein each side surface of the plurality of groove patterns connects each bottom surface of the plurality of groove patterns to the upper surface of the substrate, and wherein the side surface includes at least one curved surface.

In an embodiment of the present invention, each of the side surfaces of the plurality groove patterns, when the substrate is in a non-folded state, includes: a first surface; and a second surface facing the first surface and more spaced apart from the folding axis in the first direction than the first surface is, and wherein the first surface is inclined at a first angle with respect to the bottom surface, wherein the second surface is inclined at a second angle with respect to the bottom surface, and wherein each of the first angle and the second angle is equal to or greater than about 90 degrees and is equal to or smaller than about 140 degrees.

In an embodiment of the present invention, the first angles of each of the plurality of groove patterns are substantially the same as each other.

In an embodiment of the present invention, the plurality of groove patterns include two or more groove patterns having different the first angles from each other.

In an embodiment of the present invention, the second angles of each of the plurality of groove patterns are substantially the same as the first angles respectively facing the second angles.

In an embodiment of the present invention, at least one second angle of the second angles of the plurality of groove patterns are different from the first angles of the plurality of groove patterns.

In an embodiment of the present invention, the second angles of the plurality of groove patterns decrease as a distance between a groove pattern of the plurality of groove patterns and the folding axis decreases.

In an embodiment of the present invention, thicknesses from the lower surface of the substrate to the bottom surfaces of each of the plurality of groove patterns are the same as each other.

In an embodiment of the present invention, thicknesses from the lower surface of the substrate to the bottom surfaces of each of the plurality of groove patterns are equal to or greater than about 1 micrometer ($\mu m$) and equal to or smaller than about 30 micrometer ($\mu m$).

In an embodiment of the present invention, the bottom surfaces of each of the plurality of groove patterns have a width equal to or greater than about 40 $\mu m$.

In an embodiment of the present invention, the plurality of groove patterns are symmetrical with respect to the folding axis.

In an embodiment of the present invention, the plurality of groove patterns include a mesh pattern.

In an embodiment of the present invention, the lower surface of the substrate faces the folding axis when the substrate is in a folded state.

In an embodiment of the present invention, the window further includes a filling member disposed in the plurality of groove patterns.

According to an embodiment of the present invention, a display device includes: a display module configured to fold and un-fold; and a window disposed on the display module and configured to fold and un-fold, wherein the window includes: a substrate including a folding area, a non-folding area, an upper surface, and a lower surface, wherein the folding area is configured to fold about a folding axis; and a plurality of groove patterns arranged in the folding area along one direction crossing the folding axis, wherein each of the plurality of groove patterns includes: a bottom surface recessed from the upper surface of the substrate and substantially parallel to the upper surface of the substrate; and a side surface, wherein each side surface of the plurality of groove patterns connects each bottom surface of the plurality of groove patterns to the upper surface of the substrate, and wherein the side surface includes at least one curved surface.

According to an embodiment of the present invention, a method of manufacturing a window includes: providing a mother substrate in which a first line extending in a first direction is for forming a first groove pattern; and forming the first groove pattern in areas of the mother substrate, wherein the forming of the first groove pattern includes: irradiating, with a first laser beam, first portions, of the mother substrate, overlapping the first line; and providing an alkaline solution onto the first portions of the mother substrate to etch the first portions, and wherein a refractive index of the first portions irradiated with the first laser beam is different from a refractive index of the mother substrate before being irradiated by the first laser beam, and the first portions irradiated with the first laser beam have a thickness smaller than a thickness of a second portion of the mother substrate not irradiated by the first laser beam.

In an embodiment of the present invention, the method further includes forming a second groove pattern, wherein the forming of the second groove pattern includes: providing a second line spaced apart from the first line and extending in the first direction on the mother substrate to form the second groove pattern; irradiating, with a second laser beam, third portions and fourth portions of the mother substrate, wherein the third portions overlap the second line, and wherein the fourth portions are spaced apart from the third portions in a second direction crossing the first direction; and providing the alkaline solution onto the third portions and the fourth portions to etch the third portions and the fourth portions, and wherein the third and fourth portions irradiated with the second laser beam have a refractive index different from the refractive index of the second portion of the mother substrate not irradiated by the second laser beam, wherein the third and fourth portions irradiated with the second laser beam have a thickness smaller than the thickness of the second portion of the mother substrate not irradiated by the second laser beam, and the second groove pattern has a width greater than a width of the first groove pattern in the second direction.

In an embodiment of the present invention, the thickness of the third portions is substantially the same as the thickness of the fourth portions.

In an embodiment of the present invention, the thickness of the third portions is different from the thickness of the fourth portions.

In an embodiment of the present invention, the alkaline solution has a temperature equal to or greater than about 100 Celsius degrees and equal to or smaller than about 150 Celsius degrees.

BRIEF DESCRIPTION OF THE DRAWINGS

The above and other features of the present invention will become more apparent by describing in detail embodiments thereof with reference to the attached drawings, in which:

FIGS. 6A, 6B, 6C, 6D and 6E are cross-sectional views illustrating windows according to embodiments of the present invention;

DETAILED DESCRIPTION OF THE EMBODIMENTS

Figure 1:
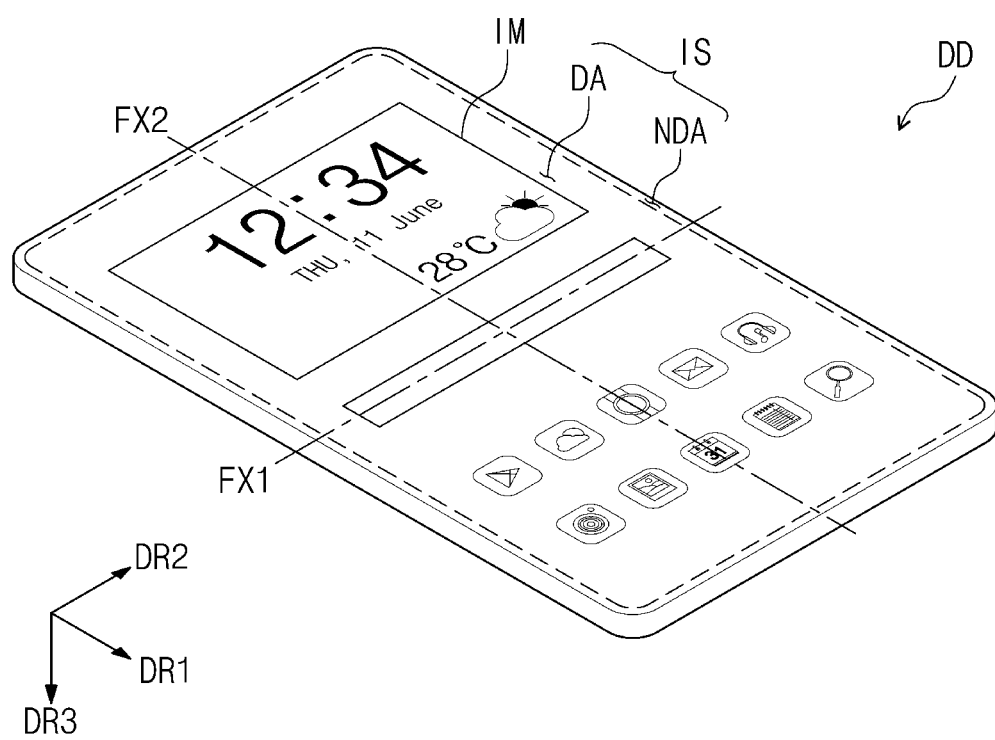
FIG. 1 is a perspective view illustrating a non-folded state of a display device according to an embodiment of the present invention.

The present invention may be variously modified and realized in many different forms, and thus specific embodiments will be exemplified in the description below in conjunction with the drawings. However, the present invention is not necessarily limited to the specific disclosed forms, and be construed to include all modifications, equivalents, or replacements without departing from the spirit and scope of the present invention.

In the present disclosure, it will be understood that when an element or layer is referred to as being "on", "connected to" or "coupled to" another element or layer, it can be directly on, directly connected or coupled to the other element or layer or intervening elements or layers may be present.

Like numerals may refer to like elements throughout the specification. In the drawings, the thicknesses, ratios, and dimensions of components may be exaggerated for clarity. In other words, since the thicknesses, ratios, and dimensions of components in the drawings may be exaggerated for clarity, the following embodiments of the present invention are not limited thereto. As used herein, the term "and/or" includes any and all combinations of one or more of the associated listed items.

It will be understood that, although the terms 'first', 'second', etc. may be used herein to describe various elements, these elements should not be limited by these terms. These terms are only used to distinguish one element from another element. Thus, a first element discussed below could be termed a second element without departing from the teachings of the present invention. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as shown in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. In addition, the terms are relative concepts and are described based on the directions indicated in the drawings.

Hereinafter, a window, a display device including the window, and a method of manufacturing the window will be described in detail with reference to the accompanying drawings.

FIG. 1 is a perspective view illustrating a non-folded state of a display device DD according to an embodiment of the present invention. FIGS. 2A to 2D are perspective views illustrating a folded state of the display device DD shown in FIG. 1.

The display device DD may be activated in response to electrical signals to provide an image IM. The display device DD may be incorporated into a variety of electronic devices to display the image IM. For example, the display device DD may be incorporated into a large-sized electronic item, such as a television set, a monitor, etc., and a small and medium-sized electronic item, such as a mobile phone, a tablet computer, a car navigation unit, a portable gaming console, etc., but it should not be limited thereto or thereby. The display device DD may be applied to other electronic devices as long as they do not depart from the spirit and scope of the present invention.

Referring to FIG. 1, a front surface of the display device DD may be a display surface IS. In the non-folded state, the display surface IS of the display device DD may correspond to a plane formed by a first direction DR1 and a second direction DR2 crossing the first direction DR1. The display surface IS may display the image IM in, for example, an upward direction, e.g., a direction opposite to a third direction DR3.

In addition, FIG. 1 and the following drawings illustrate first, second, and third directions DR1, DR2, and DR3, and the first, second, and third directions DR1, DR2, and DR3 may be relative to each other and may be changed in other directions. In each drawing, the directions indicated by the first, second, and third directions DR1, DR2, and DR3 may be assigned with the same reference numerals.

In the present disclosure, front (or, e.g., upper) and rear (or, e.g., lower) surfaces of each member of the display device DD may be defined with respect to a direction in which the image IM is displayed. The upper and lower surfaces may be opposite to each other in the third direction DR3, and a normal line direction of each of the upper and lower surfaces may be substantially parallel to the third direction DR3. A separation distance in the third direction DR3 between the upper and lower surfaces of each member may correspond to a thickness of each member. In the following descriptions, the expression "when viewed in a plane" may mean a state of being viewed from the above of each member in the third direction DR3.

The display surface IS of the display device DD may include a display area DA and a non-display area NDA. The display area DA may be an area in which the image IM is displayed, and the non-display area NDA may be an area in which the image IM is not displayed. The non-display area NDA may be adjacent to the display area DA. A user may view the image IM displayed through the display area DA. The image IM may be a video or a still image. FIG. 1 shows a clock widget and application icons as representative examples of the image IM.

The display area DA may have a quadrangular shape, however, this is merely one example. The shape of the display area DA may be designed in various ways. For example, the non-display area NDA may at least partially surround the display area DA, however, the present invention is not necessarily limited thereto or thereby. For example, the non-display area NDA may be adjacent to only one side of the display area DA or may be omitted.

As shown in FIG. 1, the display device DD may have, for example, a rectangular shape with long sides extending in the first direction DR1, short sides extending in the second direction DR2, and rounded corners. However, the shape of the display device DD is not necessarily limited to the rectangular shape, and the display device DD may have a variety of shapes.

In addition, the display device DD including a single-sided display surface IS where the display surface IS is provided on one surface of the display device DD (e.g., the front surface of the display device DD) is shown as a representative example, however, the display device DD may include a double-sided display surface where the display surface IS is provided on both the front and rear surfaces of the display device DD. The display surface IS of the display device DD should not be particularly limited.

The display device DD may be a foldable display device. The display device DD may be folded about a folding axis extending in a predetermined direction. FIG. 1 shows a first folding axis FX1 extending in the second direction DR2 and a second folding axis FX2 extending in the first direction DR1. The first folding axis FX1 may extend parallel to a short-side of the display device DD. The second folding axis FX2 may extend parallel to a long-side of the display device DD. According to an embodiment of the present invention, the display device DD may be folded about at least one folding axis of the first folding axis FX1 and the second folding axis FX2.

Figure 2A:
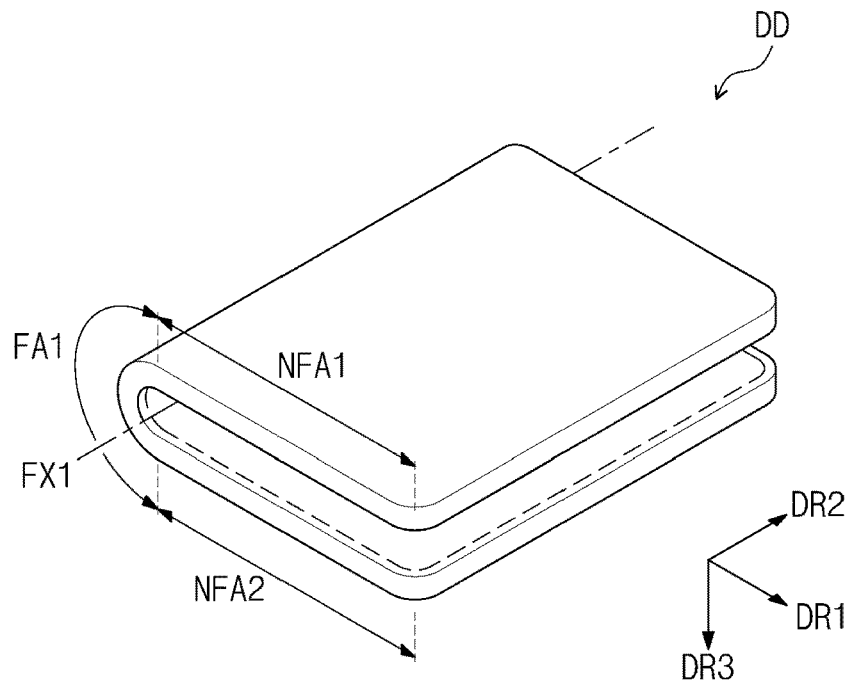
FIGS. 2A, 2B, 2C and 2D are perspective views illustrating a folded state of a display device according to an embodiment of the present invention.
Figure 2B:
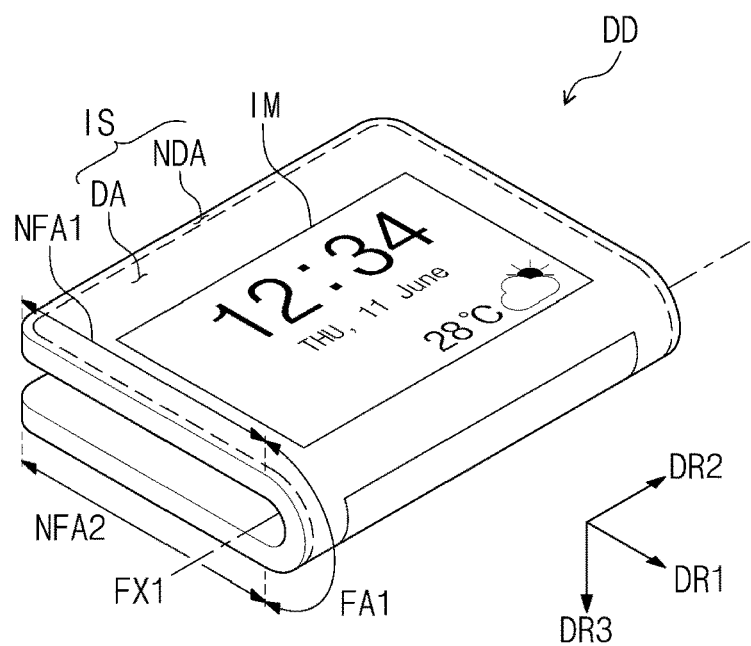
Figure 2C:
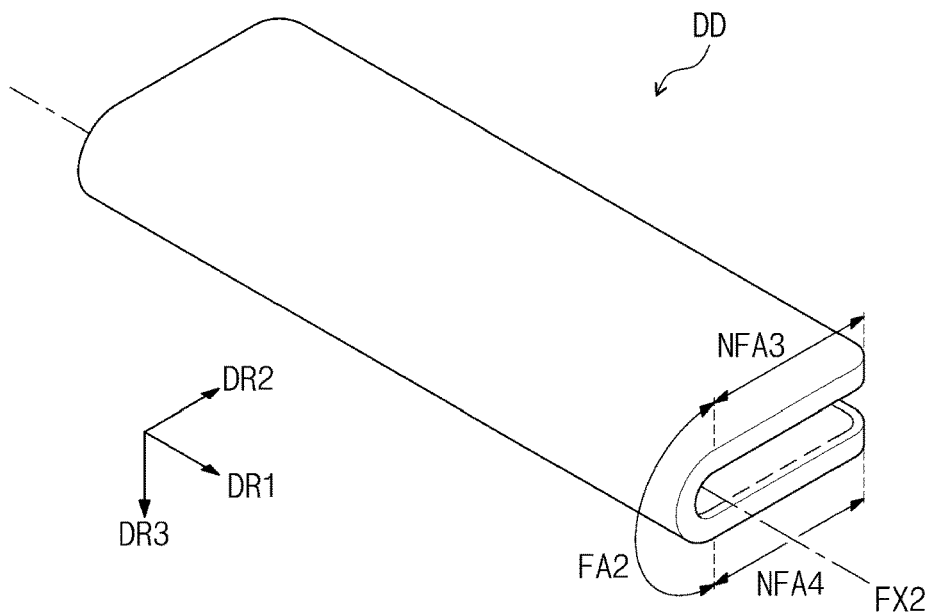
Figure 2D:
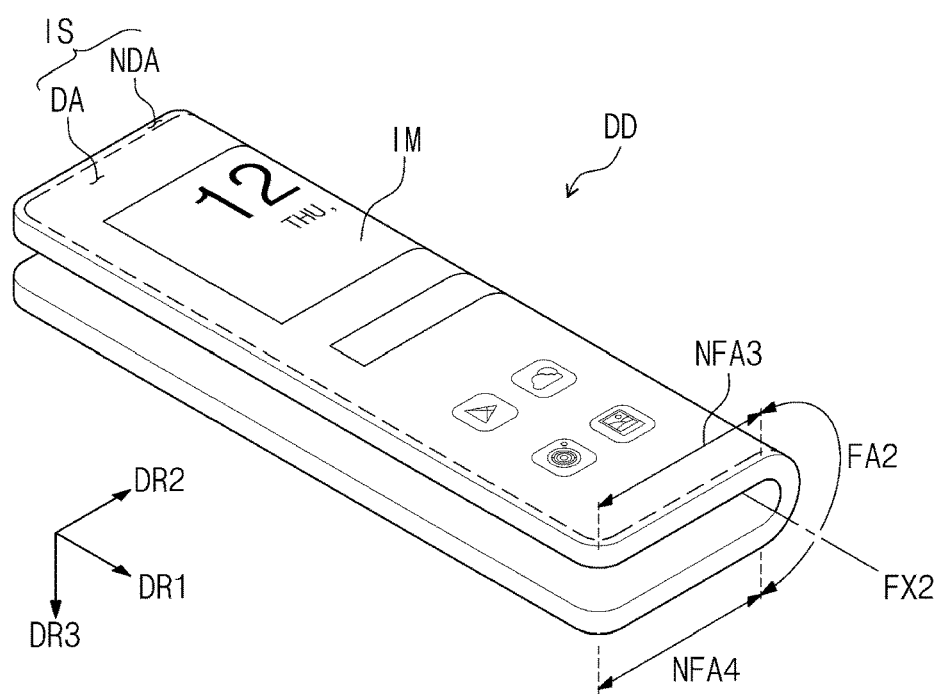

FIGS. 2A and 2B are perspective views illustrating the display device DD folded about the first folding axis FX1, and FIGS. 2C and 2D are perspective views illustrating the display device DD folded about the second folding axis FX2.

The display device DD may include a folding area and a non-folding area, which are distinguished from each other according to its operation mode. The folding area may be bent to have a predetermined curvature when the display device DD is folded about the folding axis. Further, the folding axis is positioned in the folding area. The non-folding area may be in a flat state when the display device DD is folded about the folding axis. The non-folding area may be an area in which a folding operation does not occur.

The display device DD may include at least one folding area and the non-folding area. FIGS. 2A to 2D show the display device DD including one folding area and two non-folding areas adjacent to the folding area with respect to one folding axis, however, the present invention is not necessarily limited thereto or thereby. According to an embodiment of the present invention, the display device DD may include a plurality of folding areas folded respectively about a plurality of folding axes. The number of the folding areas and the number of the non-folding areas included in the display device DD is not necessarily limited thereto or thereby.

Referring to FIGS. 2A and 2B, the display device DD folded about the first folding axis FX1 may include a first folding area FA1, a first non-folding area NFA1, and a second non-folding area NFA2. The first folding area FA1 may be folded at a predetermined curvature to surround the first folding axis FX1. The first non-folding area NFA1 may be adjacent to one side of the first folding area FA1 in the first direction DR1, and the second non-folding area NFA2 may be adjacent to the other side of the first folding area FA1 in the first direction DR1.

Referring to FIGS. 2C and 2D, the display device DD folded about the second folding axis FX2 may include a second folding area FA2, a third non-folding area NFA3, and a fourth non-folding area NFA4. The second folding area FA2 may be folded at a predetermined curvature to surround the second folding axis FX2. The third non-folding area NFA3 may be adjacent to one side of the second folding area FA2 in the second direction DR2, and the fourth non-folding area NFA4 may be adjacent to the other side of the second folding area FA2 in the second direction DR2.

The display device DD may be inwardly folded (e.g., in-folding) or outwardly folded (e.g., out-folding). In the present embodiment, a folding state, in which the display device DD is folded to allow the display surface IS overlapping the folding area to face the folding axis, is defined as the in-folding, and a folding state, in which the display device DD is folded to allow a rear surface thereof overlapping the folding area to face the folding axis, is defined as the out-folding. For example, when the display device DD is inwardly folded, the display surface IS may face itself. As another example, when the display device DD is outwardly folded, the display surface IS may face outward and away from each other. The display device DD may be manufactured to enable both in-folding and out-folding operations, or may be manufactured to enable any one of in-folding and out-folding operations.

FIG. 2A shows the display device DD inwardly folded about the first folding axis FX1, and FIG. 2C shows the display device DD inwardly folded about the second folding axis FX2. FIG. 2B shows the display device DD outwardly folded about the first folding axis FX1, and FIG. 2D shows the display device DD outwardly folded about the second folding axis FX2.

Referring to FIG. 2A, portions of the display surface IS, which respectively overlap the first non-folding area NFA1 and the second non-folding area NFA2 of the inwardly-folded display device DD, may face each other. Referring to FIG. 2C, portions of the display surface IS, which respectively overlap the third non-folding area NFA3 and the fourth non-folding area NFA4 of the inwardly-folded display device DD, may face each other. The rear surface of the inwardly-folded display device DD may be exposed to the outside.

Referring to FIG. 2B, portions of the display surface IS, which respectively overlap the first non-folding area NFA1 and the second non-folding area NFA2 of the outwardly-folded display device DD, may be exposed to the outside in directions opposite to each other. Referring to FIG. 2D, portions of the display surface IS, which respectively overlap the third non-folding area NFA3 and the fourth non-folding area NFA4 of the outwardly-folded display device DD, may be exposed to the outside in directions opposite to each other. Accordingly, the user may recognize the image IM provided by the display device DD in the out-folding state.

Figure 3:
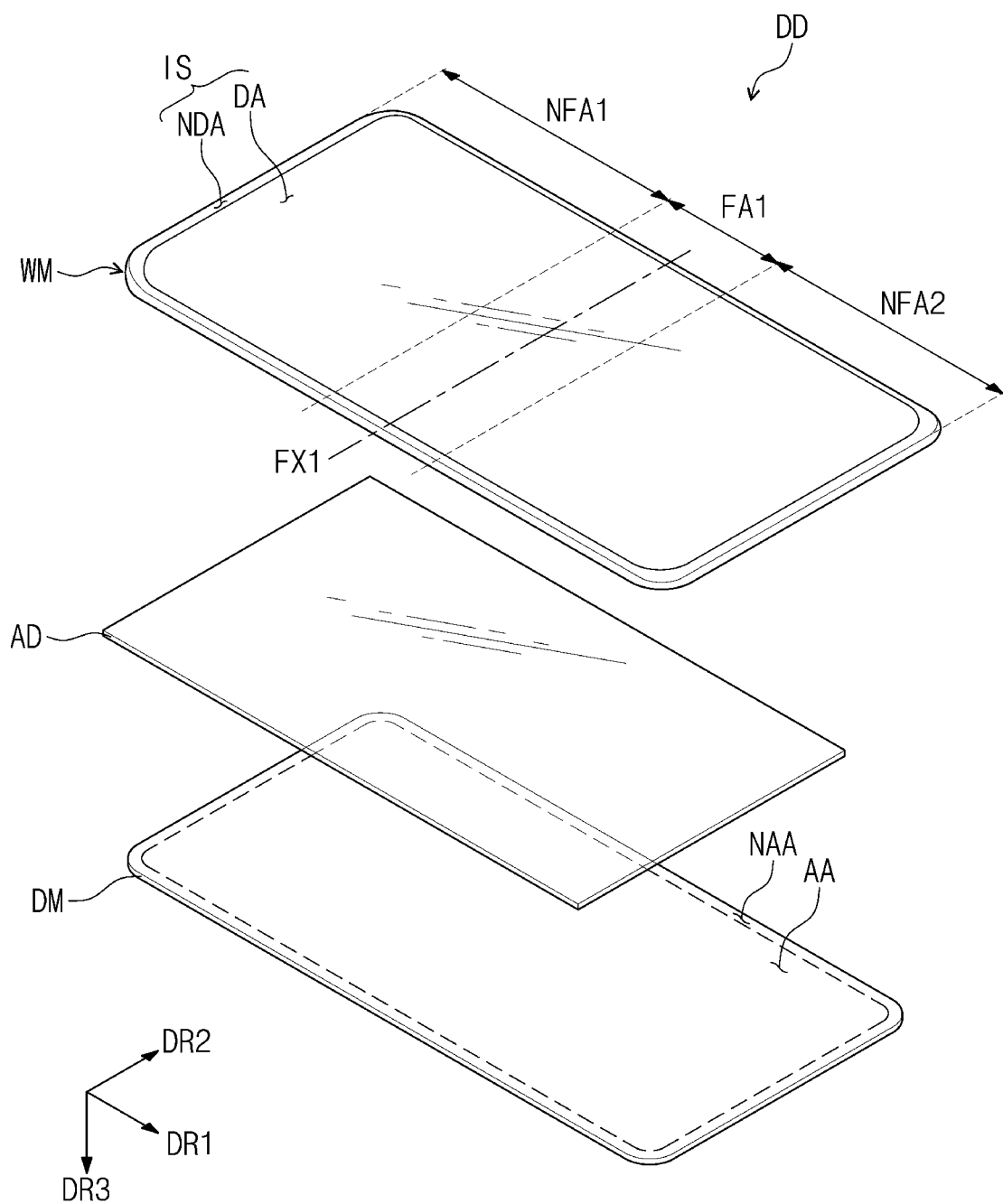
FIG. 3 is an exploded perspective view illustrating a display device according to an embodiment of the present invention.

FIG. 3 is an exploded perspective view illustrating the display device DD according to an embodiment of the present invention. FIG. 3 is an exploded perspective view showing the display device DD that is foldable about the first folding axis FX1 as a representative example. The display device DD may include a display module DM, a window WM, and an adhesive layer AD.

The display module DM may display an image in response to electrical signals and may transmit and receive information about an external input. The display module DM may include an active area AA and a peripheral area NAA.

The active area AA may be activated in response to electrical signals. For example, the display module DM may output images or may sense a variety of external inputs through the active area AA. The active area AA may correspond to at least a portion of the display area DA.

The peripheral area NAA may be adjacent to the active area AA. For example, the peripheral area NAA may at least partially surround the active area AA, however, this is merely an example. According to an embodiment of the present invention, the peripheral area NAA may be configured in various ways, for example, the peripheral area NAA may be disposed adjacent to one side of the active area AA, however, the present invention is not necessarily limited thereto. The peripheral area NAA may correspond to at least a portion of the non-display area NDA. For example, the peripheral area NAA overlaps the non-display area NDA.

The display module DM may include a display panel. The display panel may generate images emitted from the display module DM. The display panel may be a light emitting type display panel, however, the present invention is not necessarily limited thereto. For instance, the display panel may be an organic light emitting display panel or a quantum dot light emitting display panel. In addition, the display module DM may further include an input sensor disposed on the display panel to sense the external input.

The display module DM may include a plurality of pixels arranged in the active area AA and a circuit unit disposed in the peripheral area NAA. The circuit unit may apply electrical signals to the pixels to drive the pixels. The pixels may be arranged in the active area AA to form light emitting patterns. The light emitting patterns of the pixels, to which the electrical signals from the circuit unit are applied, may emit lights in response to the electrical signals, and thus, the light emitting patterns of the pixels may display the images through the active area AA.

The window WM may be disposed on the display module DM. The window WM may cover an upper surface of the display module DM. For example, the window WM may cover an entire upper surface of the display module DM. The window WM may have a shape corresponding to a shape of the display module DM. The window WM may protect the display module DM from external impacts, and thus, may prevent the display module DM from being damaged or malfunctioning due to the external impacts.

The window WM may include an optically transparent material. The window WM may include an optically transparent substrate described later. For example, the window WM may include a glass substrate, and the glass substrate may be a tempered glass substrate.

The window WM may have a single-layer structure or a multi-layer structure. For example, the window WM may have the single-layer structure of the glass substrate or may have the multi-layer structure, and the window WM having the multi-layer structure may include glass substrate and at least one of a coating layer, a filling member and/or a polymer film disposed on the glass substrate.

A front surface of the window WM may correspond to the front surface of the display device DD. The front surface of the window WM may correspond to the display surface IS of the display device DD. The front surface of the window WM may include the display area DA and the non-display area NDA.

The display area DA of the window WM may transmit the images emitted from the display module DM. The user may view the images through the display area DA of the window WM. For example, the window WM may have a predetermined color in an area overlapping the non-display area NDA. For example, the window WM may further include a printed layer formed on the glass substrate to overlap the non-display area NDA.

The window WM may be flexible. The window WM may be folded with the display module DM about the first folding axis FX1. The window WM may include a first folding area FA1 and a plurality of non-folding areas NFA1 and NFA2. The first folding area FA1 may be curved to have a predetermined curvature when folded about the first folding axis FX1, and the plurality of non-folding areas NFA1 and NFA2 may be adjacent to the first folding area FA1.

As shown in FIG. 3, the window WM may have the quadrangular shape with rounded corners, however, this is merely an example. The window WM may have a variety of shapes corresponding to that of the display module DM. The shape of the window WM may vary depending on the design of the substrate manufactured through a manufacturing process of the window WM.

The adhesive layer AD may be disposed between the window WM and the display module DM. The adhesive layer AD may attach the window WM to the display module DM. For example, the adhesive layer AD may be an optically clear adhesive (OCA) film or an optically clear adhesive resin (OCR) layer. For example, the adhesive layer AD may be integrally formed with the filling member of the window WM described later, however, the present invention is not necessarily limited thereto or thereby. According to an embodiment of the present invention, the adhesive layer AD may be omitted.

In an embodiment of the present invention, the display device DD may further include at least one functional layer disposed between the display module DM and the window WM. For example, the display device DD may further include an anti-reflective layer to reduce a reflectance of external light incident to the window WM from outside of the window WM.

Figure 4A:
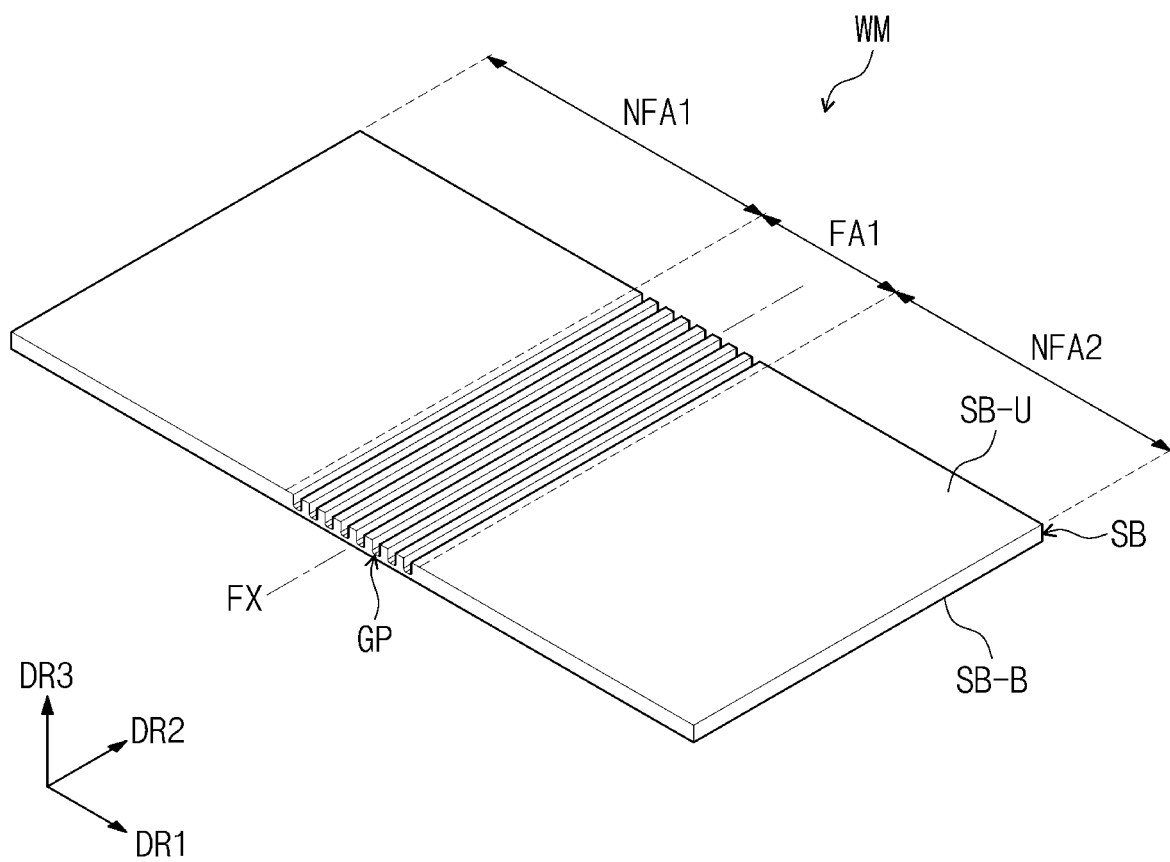
FIGS. 4A and 4B are perspective views illustrating windows according to embodiments of the present invention.
Figure 4B:
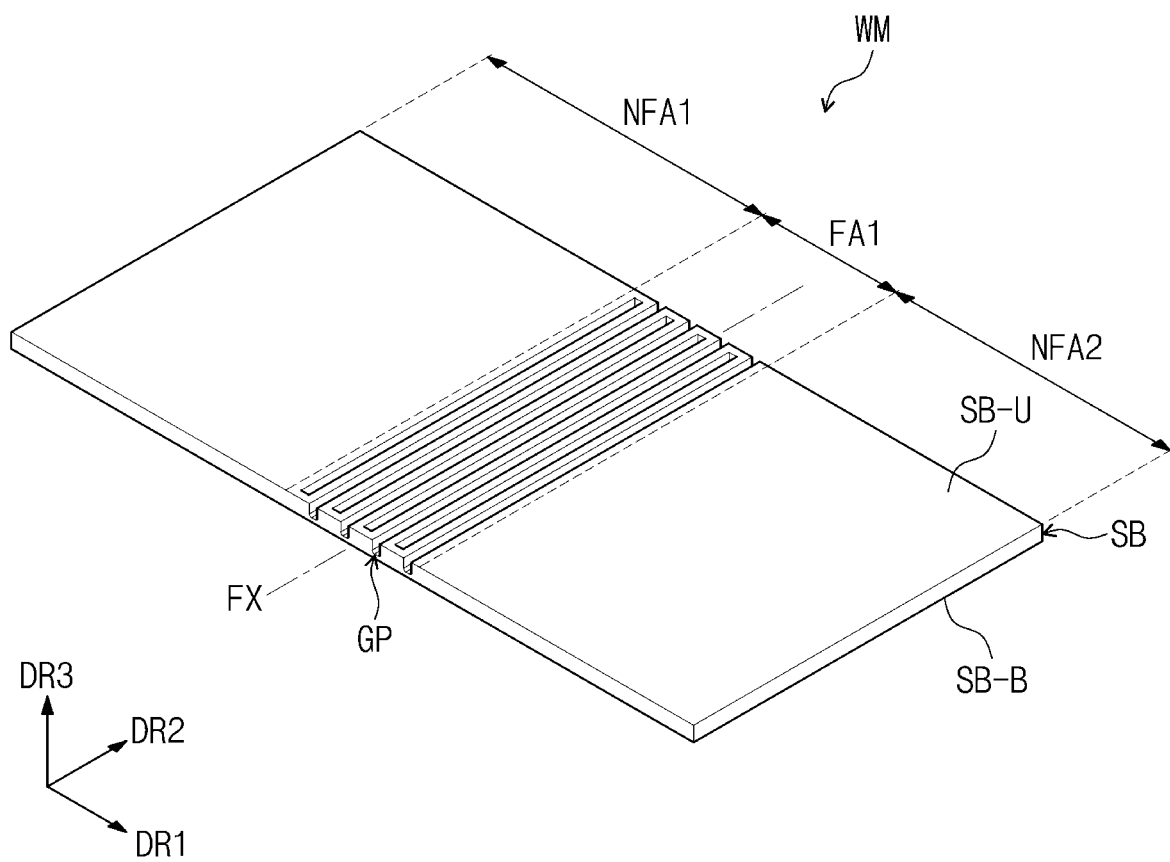

FIGS. 4A and 4B are perspective views illustrating windows WM according to embodiments of the present invention. The windows WM shown in FIGS. 4A and 4B may be disposed on the display module DM and may be incorporated into the display device DD as shown in FIG. 3, and the description about the window WM described above may be applied to the windows WM in FIGS. 4A and 4B.

Referring to FIGS. 4A and 4B, the windows WM may be folded about a folding axis FX. The folding axis FX may extend in the second direction DR2 substantially parallel to short sides of the windows WM. The folding axis FX shown in FIGS. 4A and 4B may correspond to the first folding axis FX1 of FIG. 3, however, the present invention is not necessarily limited thereto or thereby. According to an embodiment of the present invention, the windows WM may be folded about a folding axis extending in a direction substantially parallel to long sides of the windows WM, for example, the second folding axis FX2 of FIG. 1. For example, the shape of the windows WM that is foldable should not be particularly limited.

Each window WM may include a substrate SB and a plurality of groove patterns GP.

The substrate SB may include a folding area FA1 folded about the folding axis FX at a predetermined curvature and a plurality of non-folding areas NFA1 and NFA2 adjacent to the folding area FA1. The non-folding areas NFA1 and NFA2 may include a first non-folding area NFA1 and a second non-folding area NFA2. The first non-folding area NFA1 may be adjacent to one side of the folding area FA1 in the first direction DR1, and the second non-folding area NFA2 may be adjacent to the other side of the folding area FA1 in the first direction DR1. In addition, the number of the folding areas and the number of the non-folding areas included in the substrate SB should not be limited to the embodiments shown in FIGS. 4A and 4B.

The substrate SB may include an upper surface SB-U and a lower surface SB-B. Each of the upper surface SB-U and the lower surface SB-B of the substrate SB may be substantially parallel to a plane defined by the first direction DR1 and the second direction DR2. The upper surface SB-U and the lower surface SB-B of the substrate SB may be opposite to each other in the third direction DR3.

As shown in FIGS. 4A and 4B, the lower surface SB-B of the substrate SB may face the folding axis FX. The lower surface SB-B of the substrate SB may be disposed more adjacent to the folding axis FX in the third direction DR3 than the upper surface SB-U is. When the substrate SB is folded, the lower surface SB-B may be folded to surround the folding axis FX, however, present invention is not necessarily limited thereto or thereby. According to an embodiment of the present invention, the upper surface SB-U of the substrate SB may face the folding axis FX.

The substrate SB may have a cuboid shape in which the upper surface SB-U and the lower surface SB-B are substantially parallel to each of the first direction DR1 and the second direction DR2, and a height, i.e., a thickness, is defined along the third direction DR3. FIGS. 4A and 4B show the substrate SB having right-angled corners, however, the substrate SB is not necessarily limited thereto or thereby. According to an embodiment of the present invention, the substrate SB may have a cuboid shape with rounded corners to correspond to the shape of the window WM shown in FIG. 3.

The substrate SB may include, for example, an optically transparent material. For example, the substrate SB may include a glass substrate, such as a tempered glass substrate. As the substrate SB includes the glass substrate, the display device DD may have an excellent aesthetic appearance and may be prevented from being dented or scratched by sharp objects or objects with a relatively high hardness.

The substrate SB may have a predetermined thickness in the third direction DR3. The thickness of the substrate SB may have an effect on an impact resistance of the window WM. In a case where the thickness of the substrate SB is relatively thin, the substrate SB may be broken or damaged by external impacts concentrated at a localized area, for example, by external impacts caused by a pen drop. In a case where the thickness of the substrate SB is relatively thick, a flexibility of the substrate SB may decrease or the substrate SB may be broken when the substrate SB is folded. For example, the thickness of the substrate SB may be substantially equal to or greater than about 30 μm, and in another example, the thickness of the substrate SB may be equal to or greater than about 50 μm and equal to or smaller than about 300 μm. However, the thickness of the substrate SB is not necessarily be limited to the above numerical examples. The substrate SB may increase the impact resistance of the window WM, and thus, the substrate SB may protect the display module DM disposed under the window WM.

The groove patterns GP may be provided in the folding area FA1 of the substrate SB. The groove patterns GP may overlap the folding area FA1 of the substrate SB. FIGS. 4A and 4B illustrate eight groove patterns GP provided in the folding area FA1. However, the number of the groove patterns GP should not be limited thereto or thereby and may be greater or smaller than eight.

Each of the groove patterns GP may extend in one direction. For example, each of the groove patterns GP may extend in a direction substantially parallel to a direction in which the folding axis FX extends. FIGS. 4A and 4B show the groove patterns GP each extending in the second direction DR2 substantially parallel to the folding axis FX, however, the groove patterns GP should not be limited thereto or thereby. According to an embodiment of the present invention, the groove patterns GP may extend obliquely with respect to the folding axis FX to cross the direction in which the folding axis FX extends.

In an embodiment of the present invention, the groove patterns GP may be arranged in one direction crossing the folding axis FX. The groove patterns GP may be arranged to be spaced apart from each other with portions of the upper surface SB-U of the substrate SB disposed therebetween. FIGS. 4A and 4B show the groove patterns GP arranged in the first direction DR1 to be spaced apart from each other, however, the groove patterns GP is not necessarily be limited thereto or thereby. According to an embodiment to an embodiment of the present invention, at least some patterns among the groove patterns GP may be connected to cross each other and thus may be integrally formed with each other.

For example, at least one groove pattern GP of the plurality of groove patterns GP may extend from one end of the substrate SB to the other end of the substrate SB, however, the present invention is not necessarily limited thereto or thereby. According to an embodiment of the present invention, the groove pattern GP may be at least partially surrounded by the upper surface SB-U of the substrate SB when viewed in a plane. Referring to FIG. 4A, each of the groove patterns GP may extend from one side surface (or one end) of the substrate SB, which extends in the first direction DR1, to the other side surface (or the other end) of the substrate SB, which extends in the first direction DR1. For example, the groove patterns GP may extend in the second direction DR2 from a first side surface of the substrate SB, which extends in the first direction DR1, to a second side surface of the substrate SB, which extends in the first direction DR1. Referring to FIG. 4B, some groove patterns among the groove patterns GP may extend in the second direction DR2 and may be surrounded by the upper surface SB-U of the substrate SB when viewed in a plane. For example, all the groove patterns GP may be surrounded by the upper surface SB-U of the substrate SB.

The groove patterns GP may be formed by recessing portions of the substrate SB from the upper surface SB-U of the substrate SB toward the lower surface SB-B. Each of the groove patterns GP may be recessed from the upper surface SB-U of the substrate SB and may be formed by an inner side surface of the substrate SB, which is connected to the upper surface SB-U of the substrate SB, and an inner bottom surface of the substrate SB. Each of the groove patterns GP may include the inner bottom surface (hereinafter, referred to as the bottom surface) and the inner side surface (hereinafter, referred to as the side surface). The bottom surface may be substantially parallel to the upper surface SB-U, and the side surface may connect the bottom surface to the upper surface SB-U of the substrate SB. Each of the side surfaces of the groove patterns GP may include at least one curved surface. The shape and arrangement of the groove patterns GP will be described in detail below with reference to drawings.

As the groove patterns GP are arranged in the folding area FA1, the window WM may have improved folding property. A thickness of portions of the substrate SB, which overlap the groove patterns GP in the folding area FA1, may relatively decrease, and the flexibility of the substrate SB may be improved by the groove patterns GP. When the substrate SB is folded, the folding area FA1 of the substrate SB may be bent at a predetermined curvature and a compressive or tensile stress may be applied to the substrate SB in an area overlapping the folding area FA1. The groove patterns GP may reduce the compressive or tensile stress in the substrate SB and thus may prevent the substrate SB from being damaged due to the folding operation.

Figure 5A:
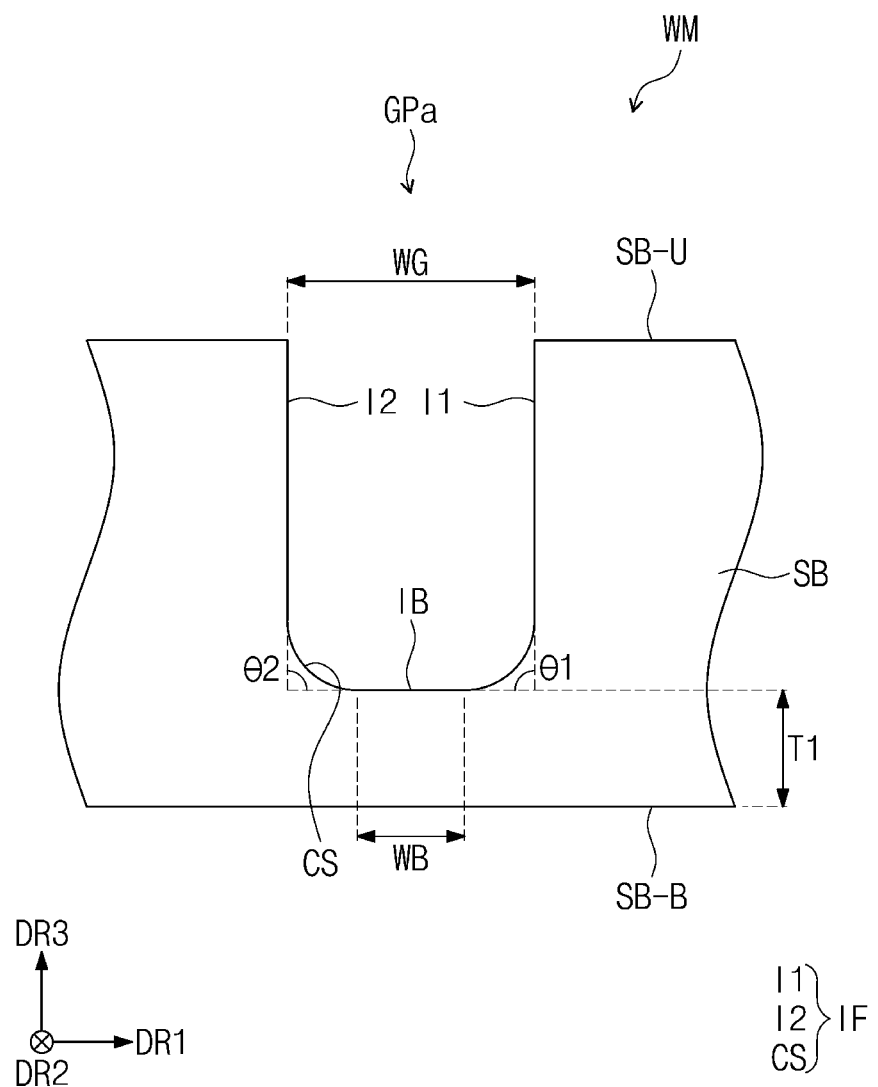
FIGS. 5A, 5B and 5C are cross-sectional views illustrating groove pattern according to embodiments of the present invention.
Figure 5B:
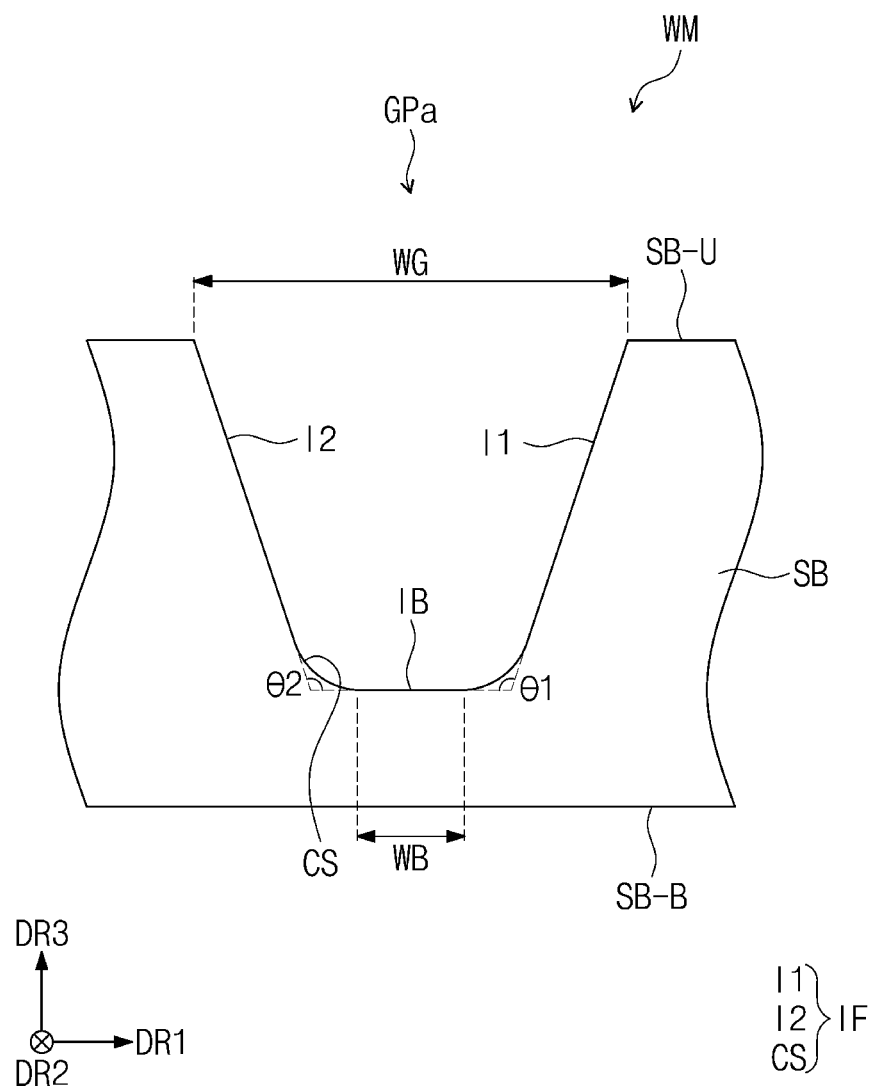
Figure 5C:
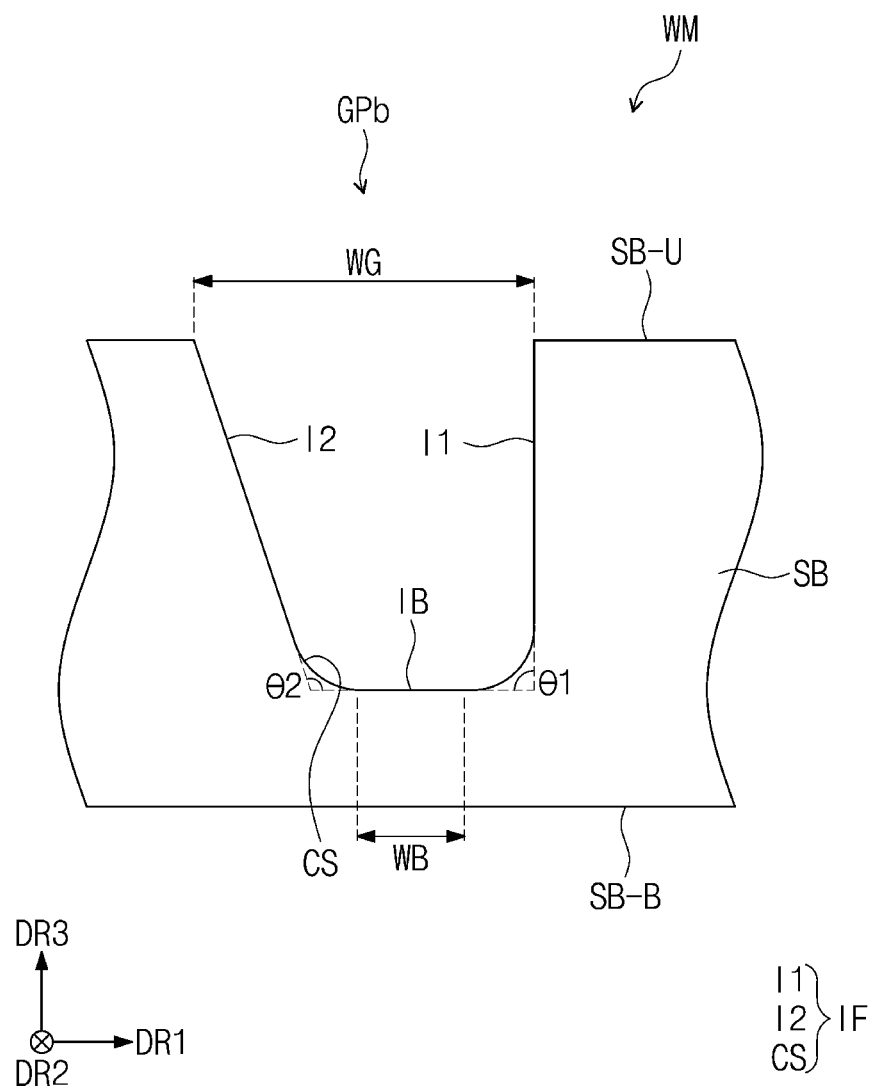

FIGS. 5A to 5C are cross-sectional views illustrating groove patterns according to embodiments of the present invention. FIGS. 5A to 5C show various cross-sections of the groove patterns as a representative example.

Referring to FIG. 5A, a groove pattern GPa may be formed by recessing a portion of a substrate SB from an upper surface SB-U of the substrate SB toward a lower surface SB-B of the substrate SB and may be formed by a side surface IF (e.g., an inner side surface) connected to the upper surface SB-U of the substrate SB and a bottom surface IB (e.g., inner bottom surface). Accordingly, the groove pattern GPa may include the bottom surface IB and the side surface IF connected to the bottom surface IB.

The bottom surface IB of the groove pattern GPa may be recessed from the upper surface SB-U of the substrate SB and may be substantially parallel to the upper surface SB-U. For example, the bottom surface IB of the groove pattern GPa may be substantially parallel to each of the first direction DR1 and the second direction DR2. The bottom surface IB of the groove pattern GPa may include a flat surface substantially parallel to the upper surface SB-U.

When viewed in a cross-section, a thickness T1 (hereinafter, referred to as a first thickness T1) from the lower surface SB-B of the substrate SB to the bottom surface IB of the groove pattern GPa may be smaller than a thickness from the lower surface SB-B of the substrate SB to the upper surface SB-U of the substrate SB. For example, the first thickness T1 may be substantially equal to or greater than about 1 micrometer (μm) and substantially equal to or smaller than about 30 micrometer (μm). A portion of the substrate SB overlapping the groove pattern GPa may have a relatively thin thickness compared with the other portion of the substrate SB, which does not overlap the groove pattern GPa, and thus, the folding property of the window WM may be improved. The other portion of the substrate SB, which does not overlap the groove pattern GPa, may have a relatively thick thickness compared with the portion of the substrate SB, which overlaps the groove pattern GPa, and thus, the window WM may have the impact resistance against the external impacts.

The side surface IF of the groove pattern GPa may be bent from the bottom surface IB and may be connected to the upper surface SB-U of the substrate SB. For example, the groove pattern GPa may have rounded corners. The side surface IF of the groove pattern GPa may be connected to the upper surface SB-U in a bent form from the upper surface SB-U of the substrate SB. The side surface IF and the bottom surface IB of the groove pattern GPa may be connected to each other and may be integrally formed with each other.

The side surface IF of the groove pattern GPa may include a first surface I1, a second surface I2, and at least one curved surface CS. The curved surface CS may be bent from the bottom surface IB and may have a predetermined curvature. The curved surface CS may connect the first surface I1 and the bottom surface IB to each other. The curved surface CS may connect the second surface I2 and the bottom surface IB to each other. Accordingly, when the window WM is folded, the stress may be prevented from being concentrated at a lower portion of the substrate SB overlapping the curved surface CS, and the window WM may be prevented from being damaged regardless of a repeated folding operation.

Each of the first surface I1 and the second surface I2 may be connected to the upper surface SB-U of the substrate SB. The first surface I1 and the second surface I2 may correspond to some portions of the side surface IF of the groove pattern GPa, which are substantially flat. The first surface I1 and the second surface I2 may face each other. The first surface I1 may face the second surface I2 in the first direction DR1 crossing a direction in which the groove pattern GPa extends.

The side surface IF of the groove pattern GPa may be inclined at a predetermined angle with respect to the bottom surface IB. A slope of the side surface IF of the groove pattern GPa may correspond to an included angle between the side surface IF and the bottom surface IB. For example, each of the first surface I1 and the second surface I2 of the side surface IF may be inclined at a predetermined angle with respect to the bottom surface IB. Included angles associated with the first surface I1 and the second surface I2 may be respectively defined as an angle between the first surface I1 and the bottom surface IB and an angle between the second surface I2 and the bottom surface IB. The included angle between the first surface I1 and the bottom surface IB may have a first angle $\Theta 1$, and the included angle between the second surface I2 and the bottom surface IB may have a second angle $\Theta 2$. Each of the first angle $\Theta 1$ and the second angle $\Theta 2$ may be substantially equal to or greater than about 90 degrees and substantially equal to or smaller than about 140 degrees.

The groove pattern GPa may have a lower width and an upper width. The lower width of the groove pattern GPa may be a width WB of the bottom surface IB of the groove pattern GPa. The width WB of the bottom surface IB may be in the first direction DR1 crossing the direction in which the groove pattern GPa extends. For example, the width WB of the bottom surface IB may be substantially equal to or greater than about 40 micrometer (μm). In a case where the width WB of the bottom surface IB is smaller than about 40 μm, when the window WM is folded, the stress may be concentrated at the lower portion of the substrate SB, which overlaps the bottom surface IB. As the bottom surface IB of the groove pattern GPa includes the flat surface with a predetermined width, the stress may be prevented from being locally concentrated at the lower portion of the substrate SB overlapping the groove pattern GPa. In addition, the groove pattern GPa may reduce the stress acting on the substrate SB when the window WM is folded, and thus, the flexibility of the window WM may be increased.

The upper width of the groove pattern GPa may be a distance from a boundary between the upper surface SB-U of the substrate SB and the first surface I1 to a boundary between the upper surface SB-U of the substrate SB and the second surface I2. For example, the upper width of the groove pattern GPa may be a distance between the first surface I1 and the second surface I2. Hereinafter, the upper width of the groove pattern GPa may be referred to a width WG of the groove pattern GPa. The width WG of the groove pattern GPa may extend along the first direction DR1 crossing the direction in which the groove pattern GPa extends.

The first angle $\Theta 1$ and the second angle $\Theta 2$ of the groove pattern may be changed in various ways depending on a method of forming the groove pattern. In addition, the width WG of the groove pattern may be substantially the same as or greater than the width WB of the bottom surface IB depending on a curvature of the curved surface CS, an area of the curved surface CS, and/or the slope of the side surface IF.

As an example, referring to FIGS. 5A and 5B, the first angle $\Theta 1$ and the second angle $\Theta 2$, which face each other, of the groove pattern GPa may be substantially the same as each other. As shown in FIG. 5A, each of the first angle $\Theta 1$ and the second angle $\Theta 2$ may have a value close to about 90 degrees. Accordingly, the first surface I1 and the second surface I2 may be substantially perpendicular to the bottom surface IB, however, the present invention is not necessarily limited thereto or thereby. As shown in FIG. 5B, each of the first angle $\Theta 1$ and the second angle $\Theta 2$ may be greater than about 90 degrees. For example, the side surface IF of the groove pattern GPa of FIG. 5B may be more inclined toward the lower surface SB-B of the substrate SB than the side surface IF of the groove pattern GPa of FIG. 5A is. As the first angle $\Theta 1$ and the second angle $\Theta 2$ are greater than about 90 degrees, a difference between the width WG of the groove pattern GPa and the width WB of the bottom surface IB may increase as the upper surface SB-U of the substrate SB is approached from the bottom surface IB.

In addition, a first angle $\Theta 1$ and a second angle $\Theta 2$, which face each other, of a groove pattern GPb may be different from each other as shown in FIG. 5C. For example, the second angle $\Theta 2$ may be greater than the first angle $\Theta 1$. Accordingly, a second surface I2 of the groove pattern GPb may be more inclined toward the lower surface SB-B of the substrate SB than a first surface I1 is. As at least one of the first angle $\Theta 1$ and the second angle $\Theta 2$ is greater than about 90 degrees, a difference between a width WG of the groove pattern GPb and a width WB of a bottom surface IB may increase as the upper surface SB-U of the substrate SB is approached from the bottom surface IB.

Accordingly, the groove patterns having different widths WG from each other may be formed by adjusting the first angle $\Theta 1$ and the second angle $\Theta 2$ of the groove patterns having the same width WB for the bottom surface IB. In addition, the embodiments shown in FIGS. 5A to 5C are merely examples, and the groove pattern may have a variety of shapes depending on the slope of the side surface, the curvature of the curved surface, the area of the curved surface, and the width of the bottom surface, however, the present invention is not necessarily limited thereto or thereby.

The groove patterns GP included in one window WM may have substantially the same shape and size as each other, however, the present invention is not necessarily limited thereto or thereby. The groove patterns GP included in one window WM may have different shapes or widths from each other. Hereinafter, embodiments of the present invention including the groove patterns will be described in detail with reference to accompanying drawings.

FIGS. 6A to 6E are cross-sectional views illustrating windows according to embodiments of the present invention. FIGS. 6A to 6E respectively illustrate embodiments of the present invention in which a shape and an arrangement of a plurality of groove patterns GP, e.g., GP1, GP2, GP3, GP4, . . . , GPn−1, and GPn. FIGS. 6A to 6E show eight groove patterns corresponding to the case where n is 8, however, the number of the groove patterns GP is not necessarily limited to eight. Details of the elements of the window described above may also be applied to elements of the windows, which are assigned with the same or similar reference numerals, in FIGS. 6A to 6E.

Referring to FIGS. 6A to 6E, the groove patterns GP may include n groove patterns GP1 to GPn arranged in the first direction DR1. The n groove patterns GP1 to GPn may be arranged in the first direction DR1 between the first non-folding area NFA1 and the second non-folding area NFA2. For the convenience of explanation, a groove pattern nearest to the first non-folding area NFA1 among the groove patterns GP may be a first groove pattern GP1, and the numbers in the reference numerals of the groove patterns may increase by one (1) as a distance from the first non-folding area NFA1 increases along the first direction DR1. Accordingly, a groove pattern farthest from the first non-folding area NFA1 among the groove patterns GP may be an n-th groove pattern GPn. The n-th groove pattern GPn may be nearest to the second non-folding area NFA2.

The groove patterns GP may be spaced apart from each other in the first direction DR1 with a portion of the upper surface SB-U of the substrate SB interposed therebetween. For example, side surfaces of the groove patterns GP adjacent to each other may be connected to the portion of the upper surface SB-U of the substrate SB.

Each of the groove patterns GP may include the side surface IF (refer to FIGS. 5A to 5C) including the first surface I1 and the second surface I2 facing the first surface I1 as described above. In the non-folded state, the first surface I1 of each of the groove patterns GP may be a surface that is relatively closer to the folding axis FX in the first direction DR1 than the second surface I2 is. The second surface I2 of each of the groove patterns GP may be relatively farther from the folding axis FX in the first direction DR1 than the first surface I1 is.

The first surface I1 and the second surface I2 of each of the groove patterns GP may be inclined at the first angle Θ1 and the second angle Θ2, respectively, with respect to the bottom surface IB. Each of the first angle Θ1 and the second angle Θ2 may be substantially equal to or greater than about 90 degrees and substantially equal to or smaller than about 140 degrees. Details of the first angle Θ1 and the second angle Θ2 described above may be applied to the first angle Θ1 and the second angle Θ2 of FIGS. 6A to 6E. The first angle Θ1 and the second angle Θ2 are briefly shown in FIGS. 6A to 6E and subsequent drawings.

In addition, the first surface I1, the second surface I2, the first angle Θ1, and the second angle Θ2 are shown in some groove patterns among the groove patterns GP in FIGS. 6A to 6E, and details of the groove patterns described above may be applied to the groove patterns from which the reference numerals of the first surface I1, the second surface I2, the first angle Θ1, and the second angle Θ2 are omitted.

Each of the groove patterns GP may have a depth corresponding to a distance from the upper surface SB-U of the substrate SB to the bottom surface IB in the third direction DR3. For example, the groove patterns GP may have substantially the same depth as each other; however, the present invention is not necessarily limited thereto. Accordingly, the thicknesses T1 (refer to FIG. 5A) from the lower surface SB-B of the substrate SB to the bottom surfaces IB of the groove patterns GP may be substantially the same as each other; however, the present invention is not limited thereto. For example, the thicknesses T1 may be different from each other.

The groove patterns GP may be symmetrical to each other about the folding axis FX as shown in FIGS. 6A to 6E. Accordingly, the stress acting on the portion of the substrate SB overlapping the folding area FA1 may also act substantially symmetrically about the folding axis FX, however, the present invention is not necessarily limited thereto or thereby. According to an embodiment of the present invention, the groove patterns GP might not be symmetrical with respect to the folding axis FX and is not necessarily limited thereto.

According to an embodiment of the present invention, a sum of a width of one groove pattern and a distance between the one groove pattern and another groove pattern adjacent to the one groove pattern in the first direction DR1 may be a pitch. For example, referring to FIGS. 6A to 6E, a sum of a width WG1 of the first groove pattern GP1 and a distance between the first groove pattern GP1 and a second groove pattern GP2 may be a first pitch D1. For example, the first pitch D1 may correspond to a distance from a second surface I2 of the first groove pattern GP1 to a second surface I2 of the second groove pattern GP2 in the first direction DR1. Similarly, a second pitch D2 may correspond to a distance from the second surface I2 of the second groove pattern GP2 to a second surface I2 of a third groove pattern GP3. In addition, an n-th pitch may correspond to a distance from a first surface I1 of an (n−1)th groove pattern GPn-1 to a first surface I1 of the n-th groove pattern GPn.

Figure 6A:
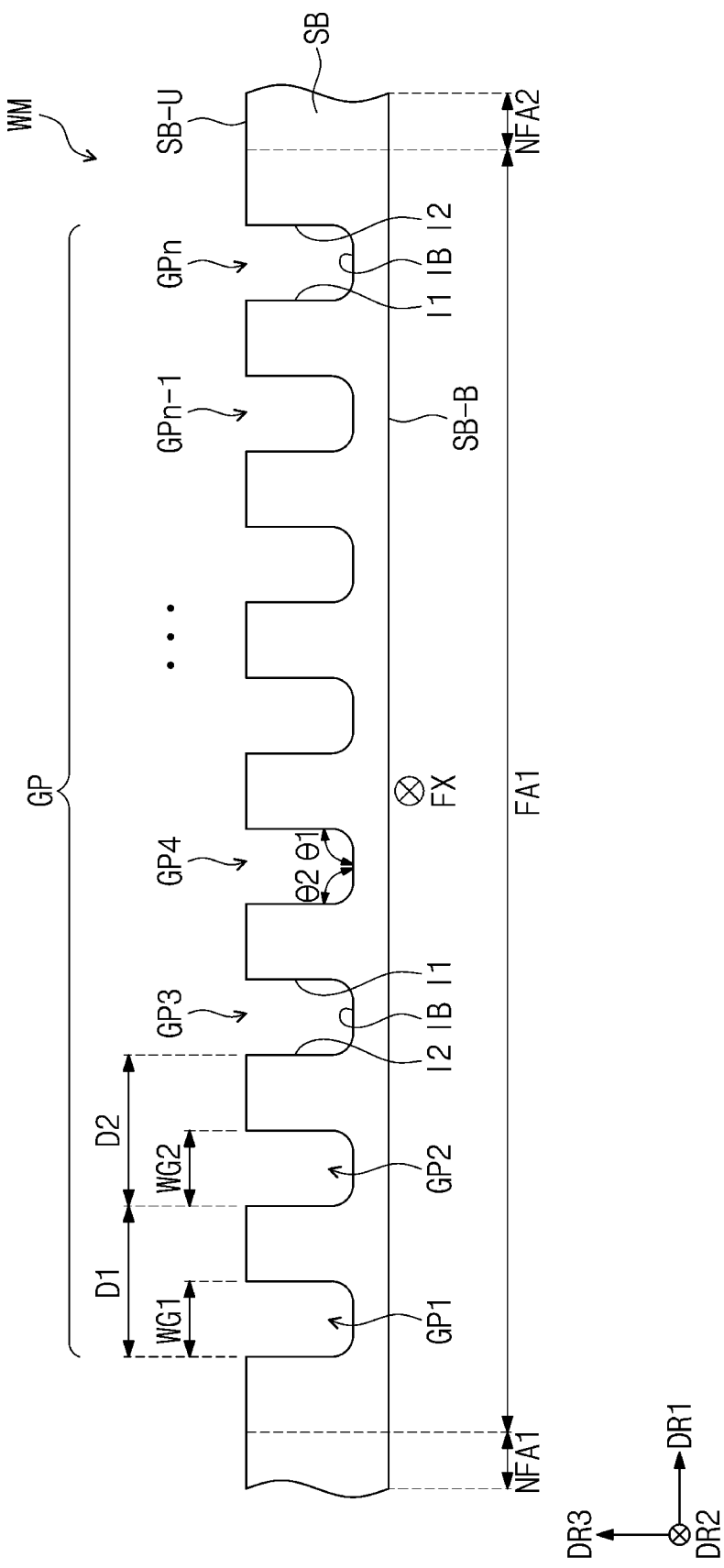

As shown in FIG. 6A, the window WM may include the groove patterns GP formed to have pitches D1 and D2 that are substantially the same as each other, however, the present invention is not necessarily limited thereto or thereby. According to an embodiment of the present invention, as shown in FIGS. 6B to 6E, the windows WMa, WMb, WMc, and WMd may include the groove patterns GP formed to have different pitches D1 and D2 from each other. Hereinafter, different features of the windows in the non-folded state will be mainly described with reference to accompanying drawings.

Figure 6C:
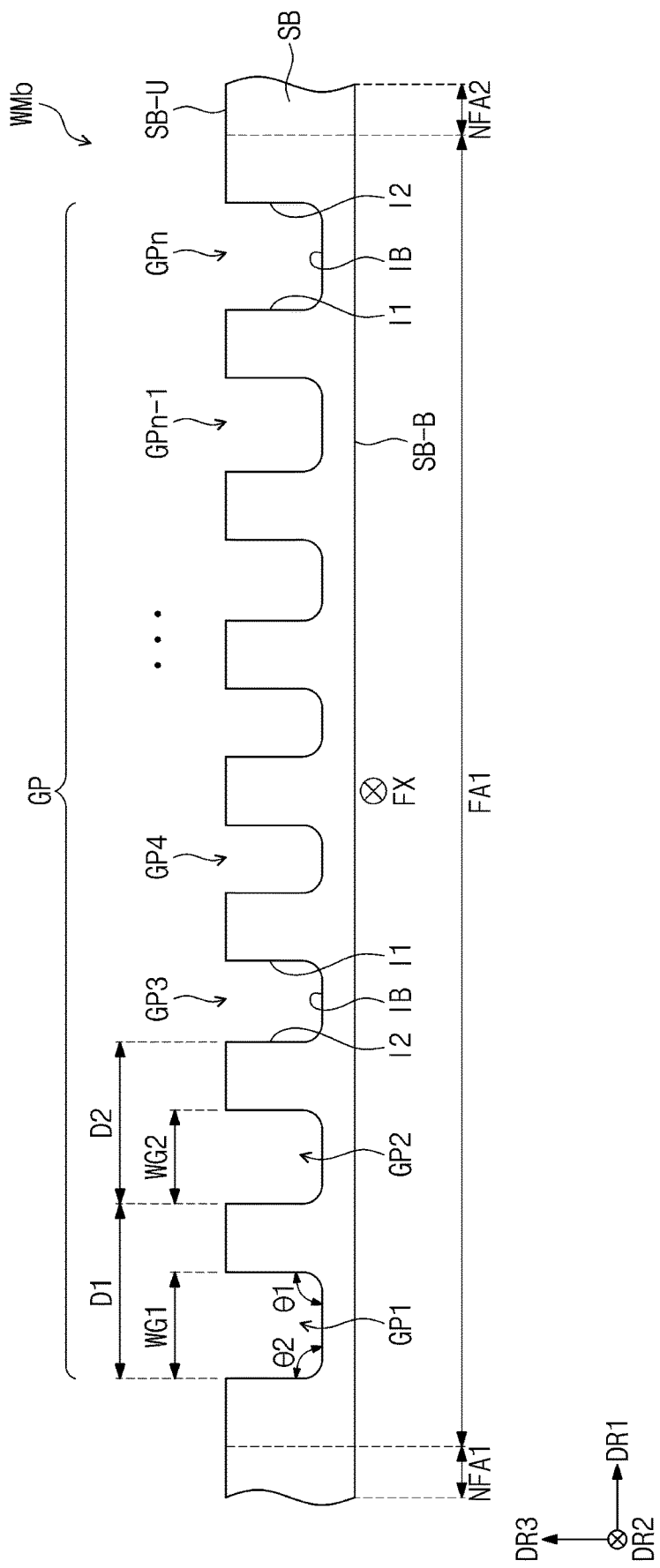

Referring to FIGS. 6A to 6C, the first angle Θ1 and the second angle Θ2, which face each other, of the groove patterns GP may be substantially the same as each other as in the groove pattern GPa shown in FIG. 5A. In addition, the first angles Θ1 of the groove patterns GP may be substantially the same as each other, and the second angles Θ2 of the groove patterns GP may be substantially the same as each other.

Referring to FIG. 6A, the groove patterns GP may be formed to have the same pitch. For example, widths of the groove patterns GP may be substantially the same as each other and distances between the groove patterns GP adjacent to each other may be substantially the same as each other. For example, the width WG1 of the first groove pattern GP1 may be the same as a width WG2 of the second groove pattern GP2. In addition, the distance between the first groove pattern GP1 and the second groove pattern GP2 may be substantially the same as the distance between the second groove pattern GP2 and the third groove pattern GP3. For example, the first pitch D1 and the second pitch D2 may be the same as each other. Similarly, the groove patterns GP having the same width as each other may be formed to have the same pitch as each other.

The flexibility of the window WM may be increased by the groove patterns GP. For example, when the groove patterns GP have the same width, distance, and shape as each other, processes of forming the groove patterns GP may be simplified.

Referring to FIGS. 6B and 6C, the windows WMa and WMb may include the groove patterns GP in which at least some groove patterns have different pitches D1 and D2 from each other. As shown in FIG. 6B, the widths of the groove patterns GP may be the same as each other, but the distances between the groove patterns GP adjacent to each other may be different from each other. As shown in FIG. 6C, the distances between the groove patterns GP adjacent to each other may be the same as each other, but the widths of the groove patterns GP may be different from each other. In addition, the widths of the groove patterns GP and the distances between the groove patterns GP may be different from each other.

The distance between the groove patterns GP adjacent to each other may gradually decrease as a distance from the folding axis FX decreases. For example, the pitch of the groove patterns GP may decrease as the distance between the groove patterns GP and the folding axis FX is reduced, however, the present invention is not necessarily limited thereto or thereby. According to an embodiment of the present invention, the distance between the groove patterns GP adjacent to each other may gradually increase as the distance from the folding axis FX decreases. According to an embodiment of the present invention, the groove patterns GP may be formed so that the distance between groove patterns GP may be random. For example, the distance between the first groove pattern GP1 and the second groove pattern GP2 may be substantially the same as the distance between the third groove pattern GP3 and a fourth groove pattern GP4 but may be different from the distance between the second groove pattern GP2 and the third groove pattern GP3.

Referring to FIG. 6C, the distance between the first groove pattern GP1 and the second groove pattern GP2 may be substantially the same as the distance between the second groove pattern GP2 and the third groove pattern GP3. However, the width WG1 of the first groove pattern GP1 may be different from the width WG2 of the second groove pattern GP2. For example, the width WG1 of the first groove pattern GP1 may be greater than the width WG2 of the second groove pattern GP2. Accordingly, the first pitch D1 may be greater than the second pitch D2. As described above, the groove patterns GP may be formed to have different pitches by adjusting the widths of each of the groove patterns GP.

The groove patterns GP may include groove patterns in which the widths WB (refer to FIG. 5A) of the bottom surface IB are different from each other. As shown in FIG. 6C, the widths of the bottom surfaces IB of the groove patterns GP may decrease as the distance between the folding axis FX and the groove pattern decreases. For example, the width of the bottom surface IB of the first groove pattern GP1 may be greater than the width of the bottom surface IB of the second groove pattern GP2, however, the present invention is not necessarily limited thereto or thereby. According to an embodiment of the present invention, the widths of the bottom surfaces IB of the groove patterns GP may increase as a distance between the groove pattern and the folding axis FX decreases.

Figure 6D:
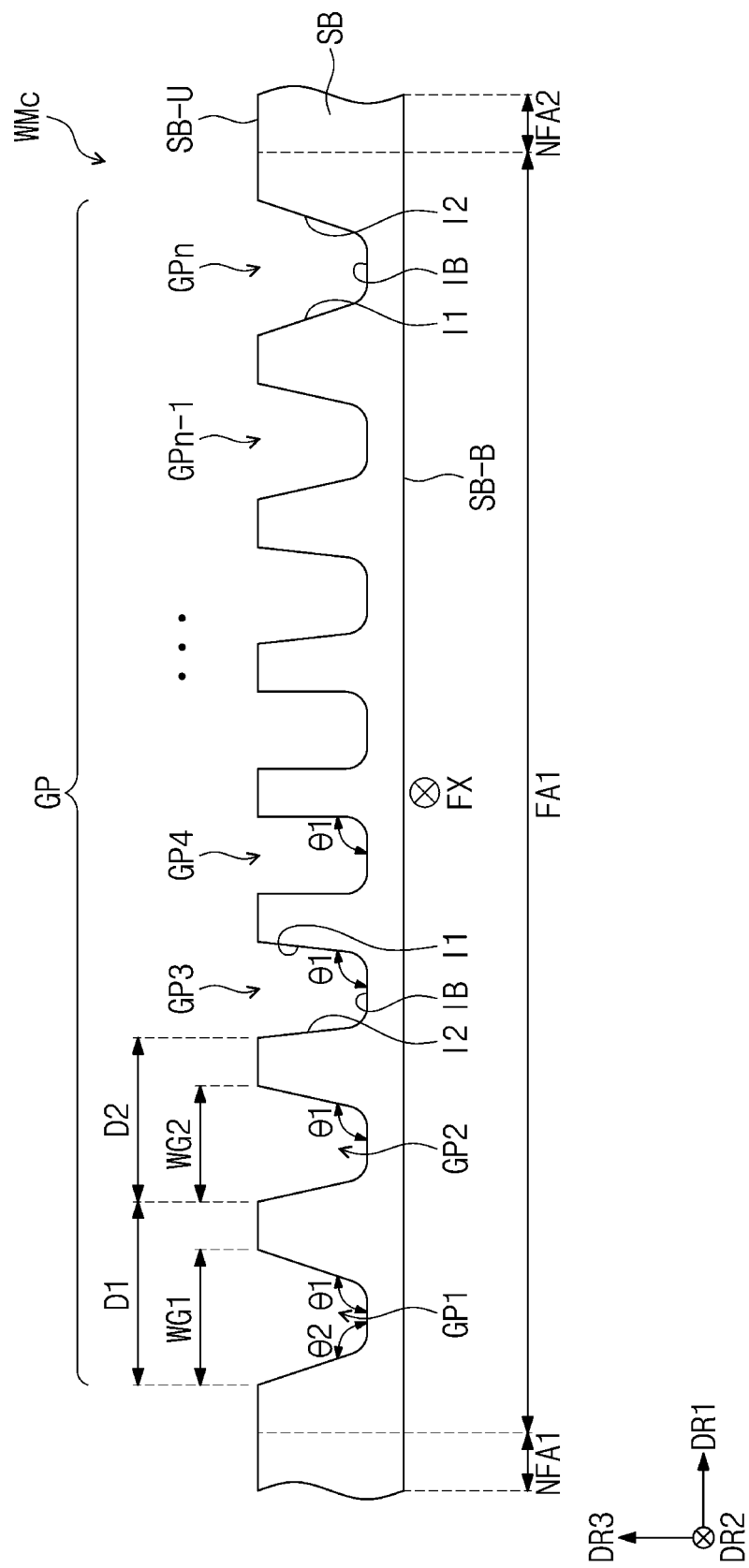

Referring to FIG. 6D, the first angle $\Theta 1$ and the second angle $\Theta 2$, which face each other, of the groove patterns GP may be substantially the same as each other similar to the groove pattern GPa shown in FIGS. 5A and 5B.

Different from the embodiments shown in FIGS. 6A to 6C, the first angles $\Theta 1$ of at least two groove patterns among the groove patterns GP may be different from each other. For example, the first angle $\Theta 1$ of the groove patterns GP may decrease as a distance from the folding axis FX decreases. For example, each second angle $\Theta 2$ of the groove patterns GP may be substantially the same as the first angle $\Theta 1$ facing thereto. Accordingly, the second angles $\Theta 2$ of the groove patterns GP may decrease as the distance from the folding axis FX decreases.

For example, the first angle $\Theta 1$ and the second angle $\Theta 2$ of the first groove pattern GP1 may be the same as each other, and the first angle $\Theta 1$ and the second angle $\Theta 2$ of the second groove pattern GP2 may be the same as each other. The first angle $\Theta 1$ of the first groove pattern GP1 may be greater than the first angle $\Theta 1$ of the second groove pattern GP2. Similarly, the second angle $\Theta 2$ of the first groove pattern GP1 may be greater than the second angle $\Theta 2$ of the second groove pattern GP2.

The side surfaces of the groove patterns GP may be more inclined toward the lower surface SB-B of the substrate SB as the distance from the groove pattern to the folding axis FX increases, however, the present invention is not necessarily limited thereto or thereby. According to an embodiment of the present invention, the side surfaces of the groove patterns GP may be more inclined toward the lower surface SB-B of the substrate SB as the distance between the groove pattern and the folding axis FX decreases.

Figure 6E:
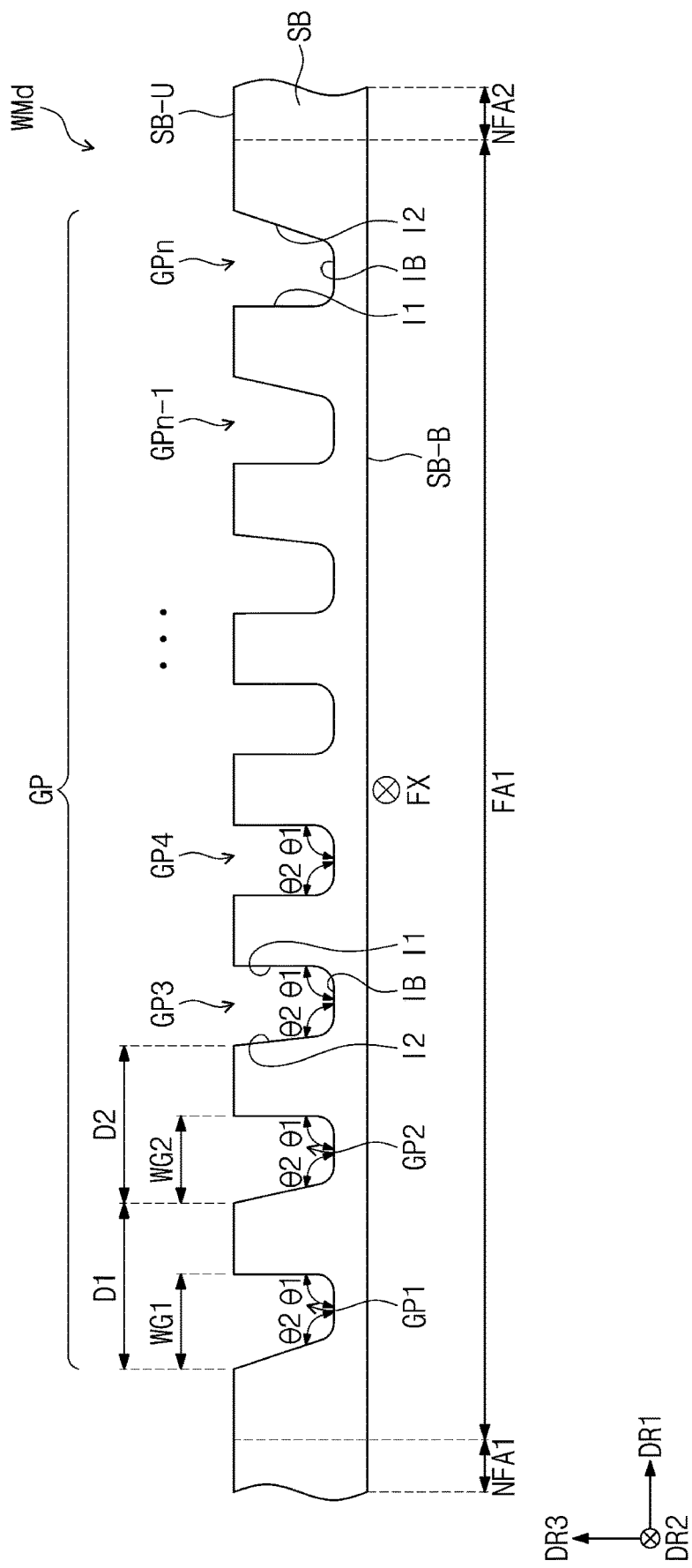

Referring to FIG. 6E, the first angle $\Theta 1$ and the second angle $\Theta 2$, which face each other, of at least some groove patterns among the groove patterns GP may be different from each other similar to the groove pattern GPb shown in FIG. 5C.

The groove patterns GP may include the groove patterns in which the first angles $\Theta 1$ are the same as each other but the second angles $\Theta 2$ are different from each other. For example, the first angles $\Theta 1$ of the groove patterns GP may be the same as each other. Slopes of the first surfaces I1 of the groove patterns GP may be the same as each other. In addition, the second angles $\Theta 2$ of the groove patterns GP may decrease as a distance between the groove pattern and the folding axis FX decreases. Accordingly, the slope of the second surface I2 may be closer to (or, e.g., substantially equal to) the slope of the first surface I1 as the distance between the groove pattern and the folding axis FX decreases. For example, the second surfaces I2 of the groove patterns GP may be more inclined toward the lower surface SB-B of the substrate SB as the distance between the groove pattern and the folding axis FX, in the first direction DR1, increases.

For example, the first angle $\Theta 1$ and the second angle $\Theta 2$ of the first groove pattern GP1 may be different from each other, and the first angle $\Theta 1$ and the second angle $\Theta 2$ of the second groove pattern GP2 may be different from each other. For example, the first angle $\Theta 1$ of the first groove pattern GP1 may be substantially the same as the first angle $\Theta 1$ of the second groove pattern GP2. The second angle $\Theta 2$ of the first groove pattern GP1, which is more distant from the folding axis FX than the second groove pattern GP2 is, may be greater than the second angle $\Theta 2$ of the second groove pattern GP2. Similarly, the first angle $\Theta 1$ of each of the third groove pattern GP3 and the fourth groove pattern GP4 may be substantially the same as the first angle $\Theta 1$ of the first groove pattern GP1. However, the second angle Θ2 of the third groove pattern GP3, which is closer to the folding axis FX than the second groove pattern GP2 is, may be smaller than the second angle Θ2 of the second groove pattern GP2.

In addition, the present invention is not necessarily limited thereto or thereby. According to an embodiment of the present invention, the groove patterns GP may include groove patterns in which the second angles Θ2 are the same as each other but the first angles Θ1 are different from each other. For example, the slopes of the second surfaces I2 of the groove patterns GP may be the same as each other, and the slope of the first surface I1 may be closer to the slope of the second surface I2 as the distance between the groove pattern and the folding axis FX increases.

Referring to FIGS. 6D and 6E, the bottom surfaces IB of the groove patterns GP may have substantially the same width WB as each other (refer to FIG. 5A). The groove patterns GP may have different widths from each other depending on the size of the first angle Θ1 and the second angle Θ2. For example, the bottom surfaces IB of the first groove pattern GP1 and the second groove pattern GP2 may have the same width as each other. The first angle Θ1 and/or the second angle Θ2 of the first groove pattern GP1 may be greater than the first angle Θ1 and/or the second angle Θ2 of the second groove pattern GP2, and thus, the width WG1 of the first groove pattern GP1 may be greater than the width WG2 of the second groove pattern GP2. For example, the groove patterns GP of the windows WMc and WMd may be formed to allow the groove patterns adjacent to each other to have different pitches.

In addition, FIGS. 6D and 6E show embodiments of the present invention in which the distances between the groove patterns GP are the same as each other, however, present invention is not necessarily limited thereto or thereby. According to an embodiment of the present invention, at least some distances among the distances between the groove patterns GP may have different values from each other.

When the window WM including the groove patterns GP with a uniform pitch is disposed on the display module DM, a moiré phenomenon may be caused by the pixels of the display module DM, which have a predetermined pattern. The moiré phenomenon is a phenomenon in which an interference pattern is seen by overlapping components, each of which have a predetermined arrangement. However, the groove patterns GP may be formed such that the groove patterns adjacent to each other may have different pitches from each other by adjusting the width and/or the distance of the groove patterns. Accordingly, the moiré phenomenon caused in the display device DD may be reduced, and a visibility of the display device DD may be increased. For example, in a case where the slope of the side surfaces of the groove pattern is substantially equal to or greater than about 90 degrees, e.g., about 135 degrees, the visibility of the display device DD may be effectively increased.

Figure 7:
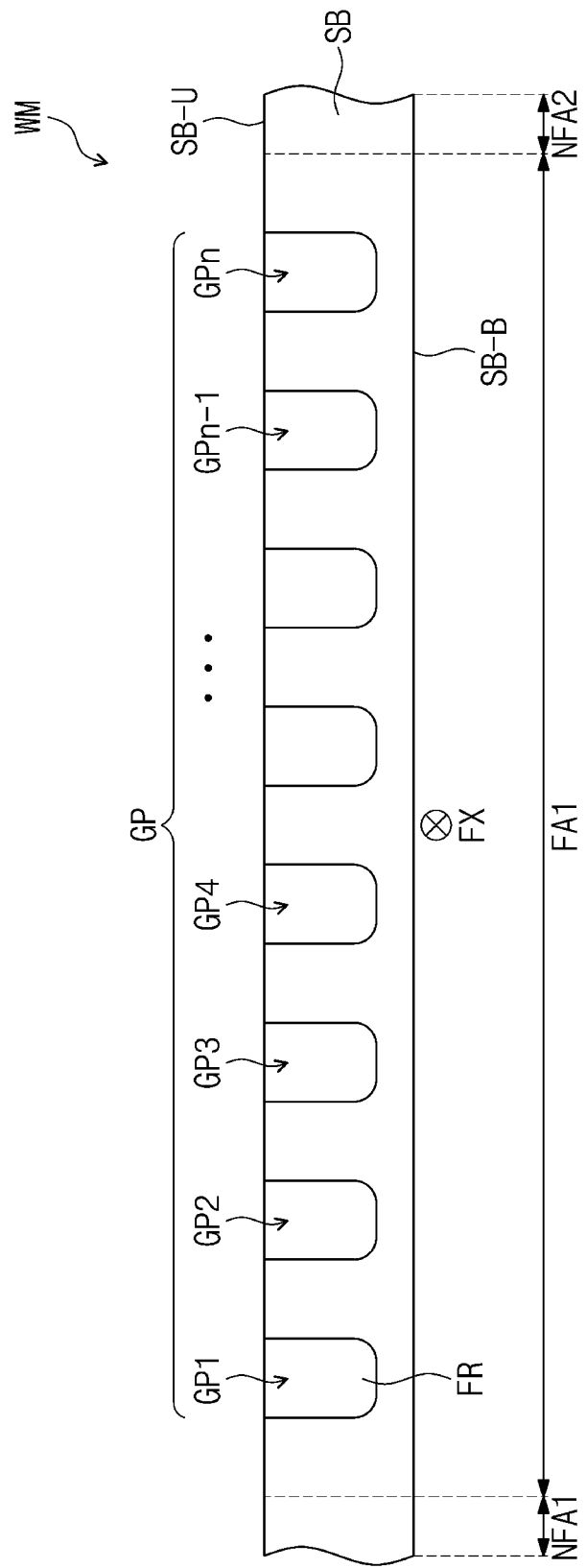
FIG. 7 is a cross-sectional view illustrating a window according to an embodiment of the present invention.

FIG. 7 is a cross-sectional view showing a window WM according to an embodiment of the present invention. The window WM shown in FIG. 7 includes substantially the same configurations as those of the window WM shown in FIG. 6A except some configurations. In FIG. 7, descriptions will be focused on the differences with FIG. 6A, and the following descriptions may be applied to the above-described embodiments.

Referring to FIG. 7, the window WM may further include a filling member FR. The filling member FR may be disposed in groove patterns GP to fill the groove patterns GP. The filling member FR may be in contact with a bottom surface and a side surface of the groove patterns GP. The filling member FR may have a shape corresponding to a shape of the groove patterns GP. As the filling member FR fills an inner spaces provided by the groove patterns GP, the external impacts may be absorbed, and the impact resistance of a folding area FA1 of the window WM may be compensated for.

The filling member FR may include an organic material. As an example, the filling member FR may include a resin having elasticity. The filling member FR may maintain the improved folding property of the window WM and may prevent the window WM from being deformed due to the compressive or tensile stress applied thereto during the folding operation.

The filling member FR may include an optically transparent material. Accordingly, the user may view the images provided through the display surface IS (refer to FIG. 3) overlapping the folding area FA1 of the window WM. For example, the images may be viewed through the display surface IS overlapping the folding area FA1 of the window WM when the display device is in an unfolded state.

The filling member FR may include the same material as that of the adhesive layer AD (refer to FIG. 3). The filling member FR may be integrally formed with adhesive layer AD (refer to FIG. 3), however, the present invention is not necessarily limited thereto or thereby. According to an embodiment of the present invention, the filling member FR and the adhesive layer AD (refer to FIG. 3) may include different materials from each other.

Figure 8A:
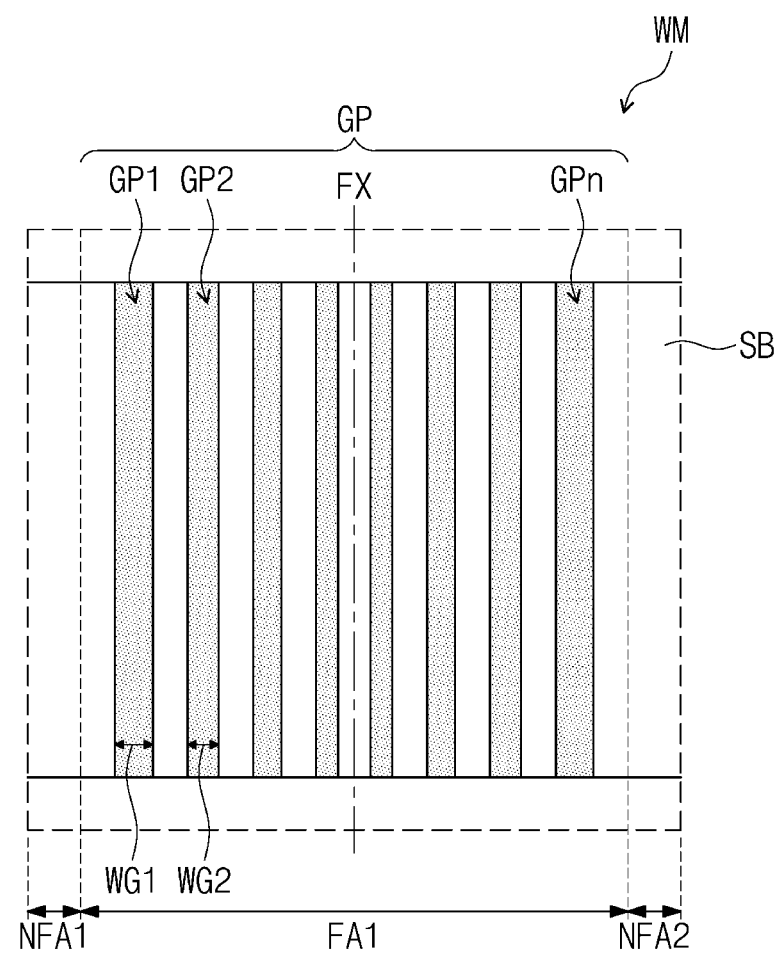
FIGS. 8A, 8B and 8C are plan views illustrating windows according to embodiments of the present invention.
Figure 8B:
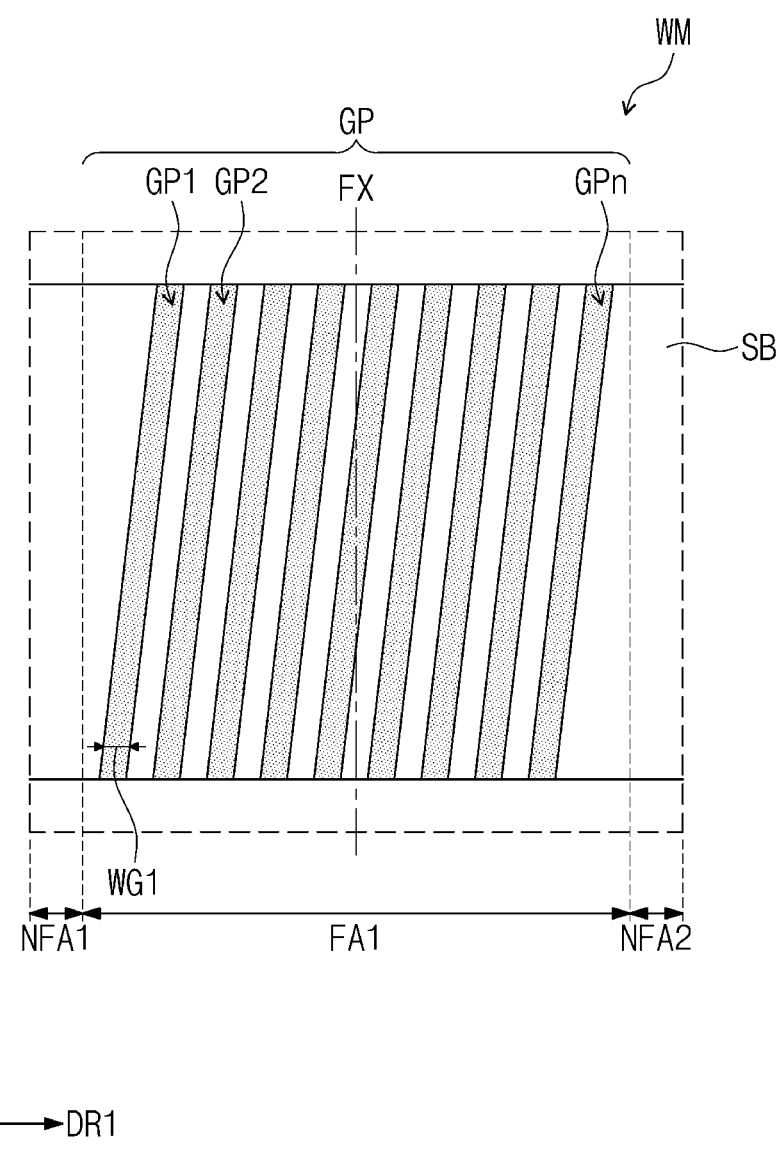
Figure 8C:
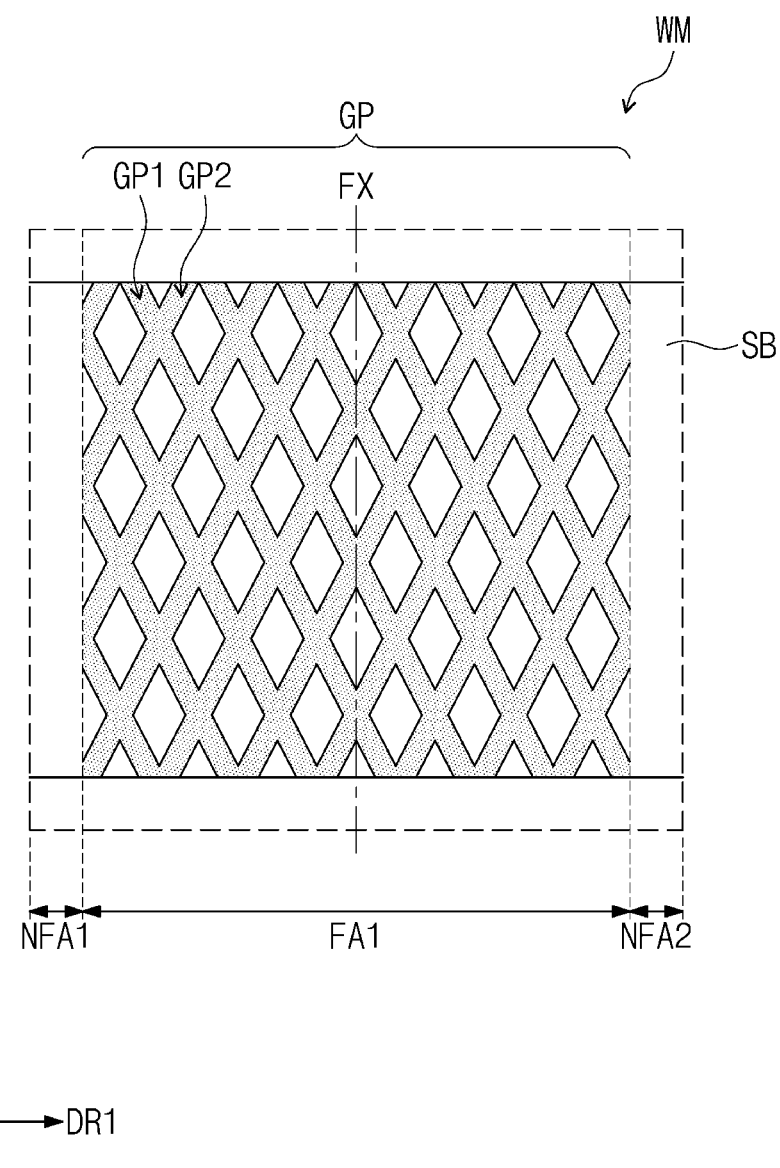

FIGS. 8A to 8C are plan views showing windows WM according to embodiments of the present invention. For the convenience of explanation, groove patterns GP recessed from an upper surface of a substrate SB are shown hatched in FIGS. 8A to 8C.

Referring to FIG. 8A, the groove patterns GP may be arranged in a folding area FA1 along the first direction DR1. The groove patterns GP may extend in the second direction DR2 crossing the direction in which the groove patterns GP are arranged, which is the first direction DR1. The direction in which the groove patterns GP extend may be substantially parallel to a direction in which a folding axis FX extends.

The groove patterns GP may be symmetrical with respect to the folding axis FX. The groove patterns GP may have a width decreasing as a distance between the groove pattern and the folding axis FX decreases. However, the present invention is not necessarily limited thereto. For example, the width of the groove patterns GP may increase as the distance between the groove pattern and the folding axis FX decreases, or widths of the groove patterns GP may be the same as each other, and the widths of the groove patterns GP should not be limited thereto.

Referring to FIG. 8B, the groove patterns GP may be arranged in a folding area FA1 along the first direction DR1. The groove patterns GP may extend in a direction inclined with respect to a folding axis FX extending in the second direction DR2. For example, the groove patterns GP may extend in direction intersecting the first direction DR1 and the second direction DR2. The groove patterns GP may be inclined to be closer to the second direction DR2, which is parallel to the folding axis FX, than to the first direction DR1, which is perpendicular to the folding axis FX, when viewed in a plane. Widths WG1 of the groove patterns GP, which are extend in the first direction DR1, may be the same as each other, however, the present invention is not necessarily limited thereto or thereby.

In addition, at least some of the groove patterns GP may cross each other and may be integrally formed with each other. Referring to FIG. 8C, the groove patterns GP may include two or more groove patterns GP1 and GP2 extending in different directions from each other. The groove patterns GP may include first groove patterns GP1 and second groove patterns GP2 extending in a direction that crosses the first groove patterns GP1. For example, the first groove patterns GP1 and the second groove patterns GP2 may extend obliquely in opposite directions at substantially the same angle with respect to the second direction DR2.

The first groove patterns GP1 and the second groove patterns GP2 may cross each other to partially overlap each other. Portions of the first groove patterns GP1 that overlap portions of the second groove patterns GP2 may be integrally formed with and may be connected to the overlapped portions of the second groove patterns GP2. For example, the groove patterns GP may form mesh patterns. Accordingly, portions of the upper surface of the substrate SB, which overlap the folding area FA1, may be surrounded by the groove patterns GP to form an island shape when viewed in a plane. The folding property of the window WM may be improved by the groove patterns GP including the mesh patterns.

In addition, FIGS. 8A to 8C illustrate the shape of the groove patterns GP when viewed in a plane. The arrangement and the shape of the groove patterns GP in a plane may be changed in various ways as long as they do not depart from the spirit and scope of the present invention.

Figure 9A:
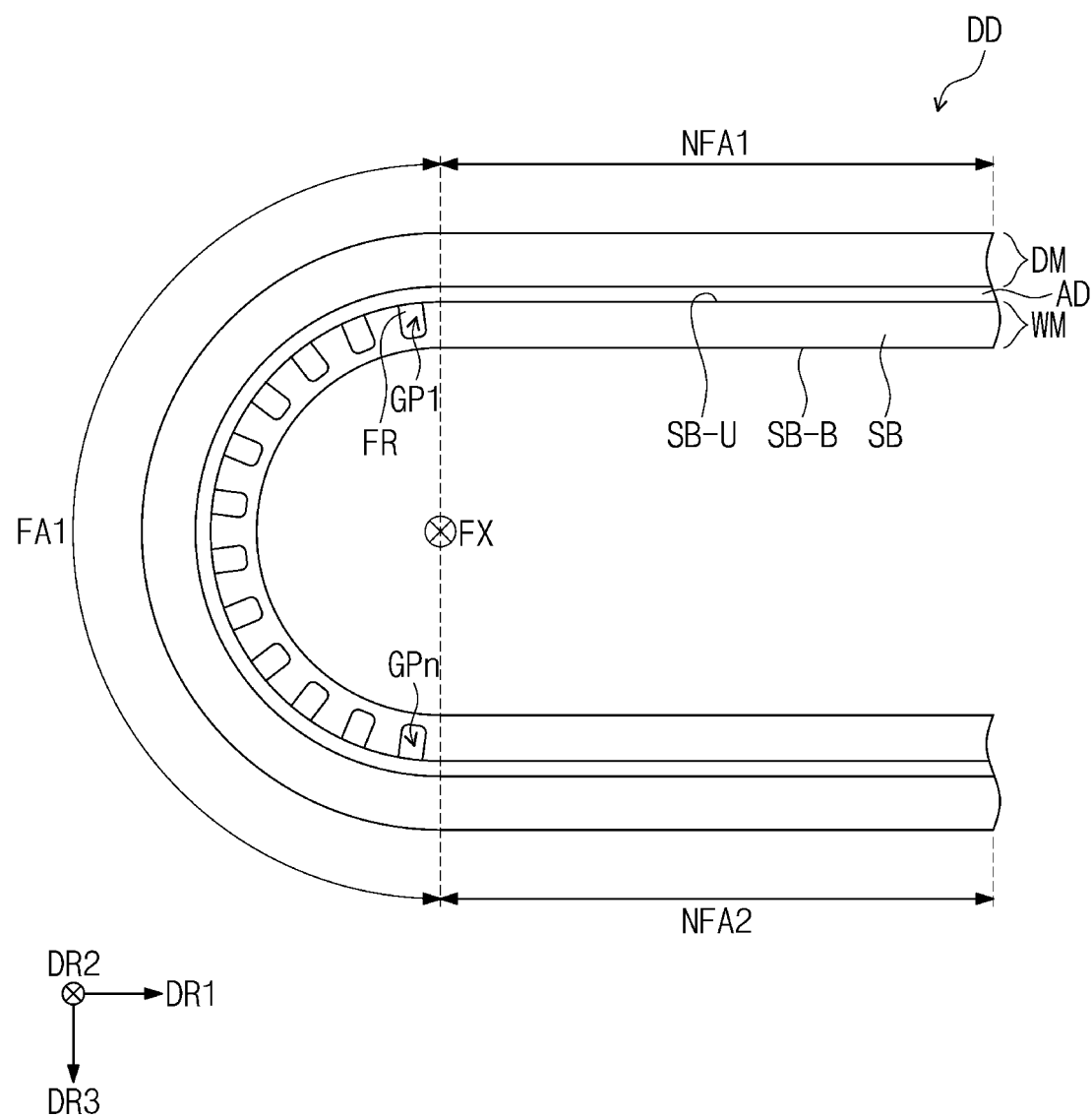
FIGS. 9A, 9B and 9C are cross-sectional views illustrating a folded state of display devices according to embodiments of the present invention.
Figure 9B:
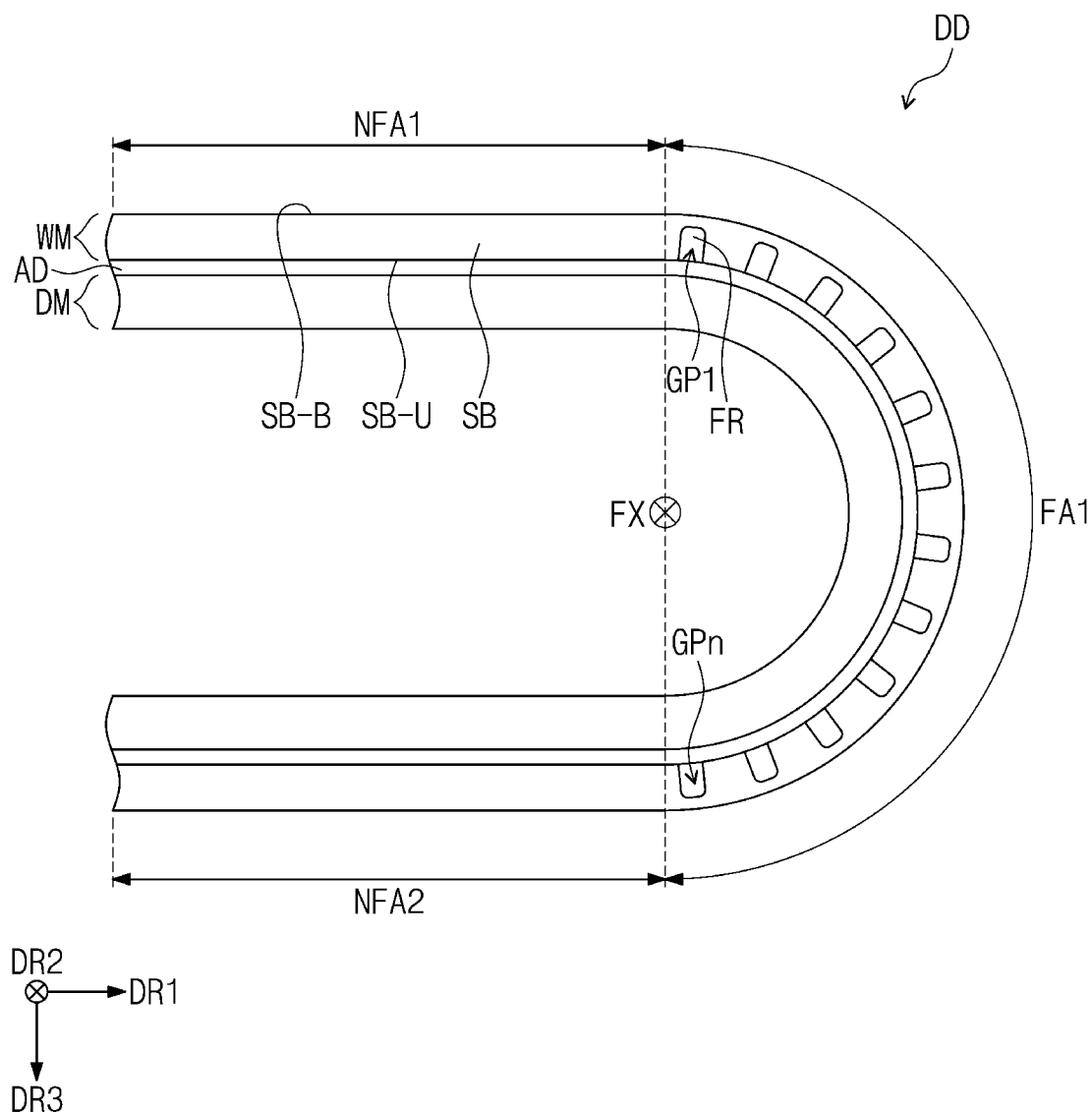
Figure 9C:
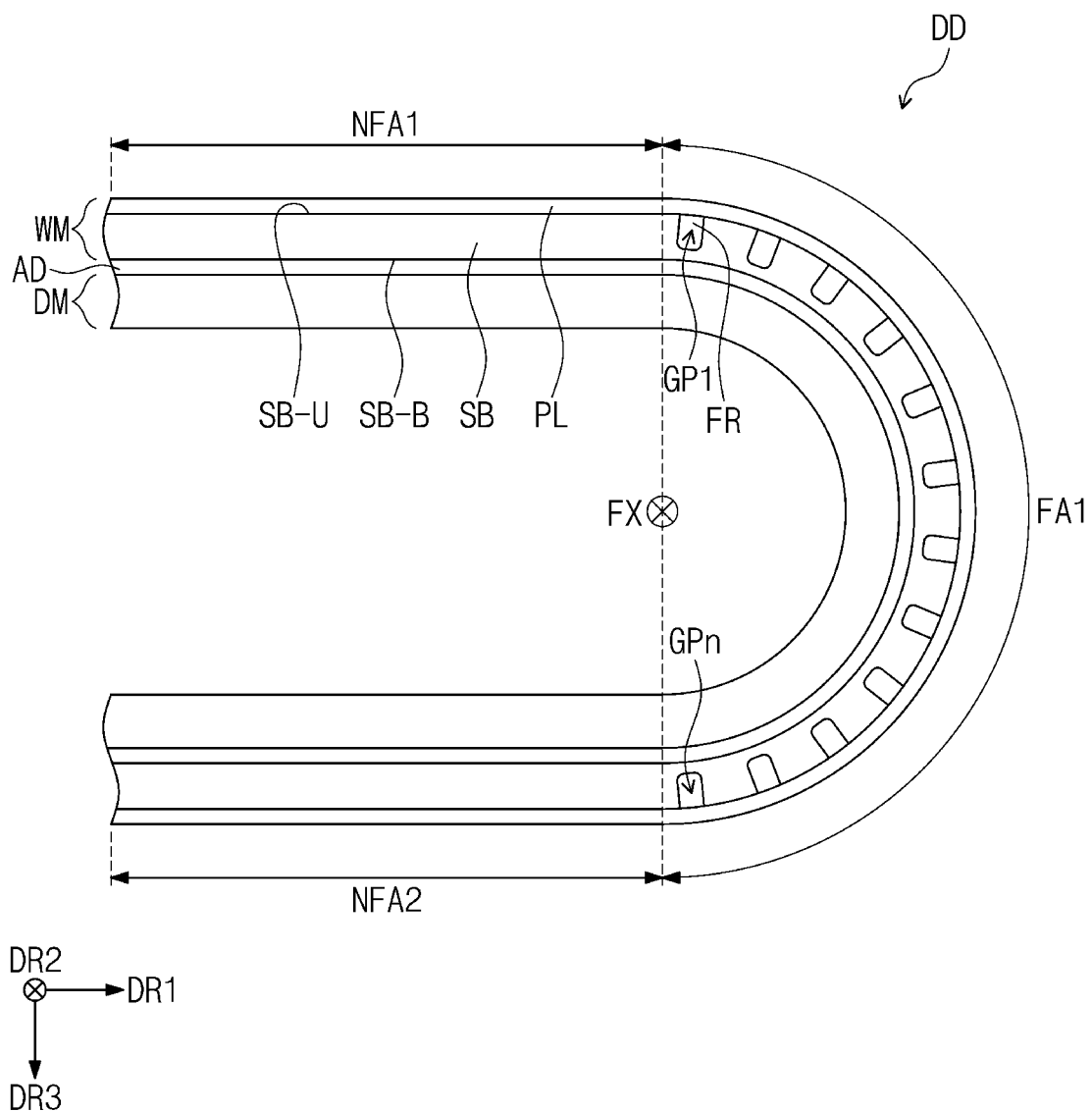

FIGS. 9A to 9C are cross-sectional views illustrating display devices DD according to embodiments of the present invention. FIGS. 9A to 9C are cross-sectional views illustrating portions of the display devices DD corresponding to a folding area FA1 and non-folding areas NFA1 and NFA2. Referring to FIGS. 9A to 9C, the display device DD may include a window WM, a display module DM, and an adhesive layer AD. The window WM may include a substrate SB, a plurality of groove patterns GP1 to GPn, and a filling member FR. Details on the configurations described with reference to the above embodiments may be applied to the same configurations in FIGS. 9A to 9C.

The window WM may be included in a foldable display device DD that enables only one of an in-folding operation and an out-folding operation, however, the present invention is not necessarily limited thereto or thereby. According to an embodiment of the present invention, the window WM may be used in a display device DD designed to enable both in-folding and out-folding operations in one display device DD.

FIG. 9A shows a cross-section of the display device DD that is inwardly folded to allow display surfaces respectively overlapping a first non-folding area NFA1 and a second non-folding area NFA2 of the display module DM to face each other. This may correspond to the display device DD shown in FIG. 2A. FIG. 9B shows a cross-section of the display device DD that is outwardly folded to allow the display surfaces respectively overlapping the first non-folding area NFA1 and the second non-folding area NFA2 of the display module DM to face the outside in directions opposite to each other. This may correspond to the display device DD shown in FIG. 2B.

Referring to FIGS. 9A and 9B, an upper surface SB-U of the substrate SB may face the display module DM. For example, the window WM may be disposed such that the upper surface SB-U of the substrate SB is disposed more adjacent to the display module DM than a lower surface SB-B is in the third direction DR3.

Referring to FIG. 9A, the lower surface SB-B of the substrate SB may face a folding axis FX in the in-folding state. When the display device DD is folded, the lower surface SB-B of the substrate SB may be folded to surround the folding axis FX. Referring to FIG. 9B, the upper surface SB-U of the substrate SB may face the folding axis FX in the out-folding state. When the display device DD is folded, the upper surface SB-U of the substrate SB may be folded to surround the folding axis FX.

The groove patterns GP1 to GPn and the filling member FR disposed in the groove patterns GP1 to GPn may absorb the compressive or tensile stress acting on the window WM when the display device DD is folded, and thus, the folding property of the window WM may be improved. Portions of the substrate SB, which overlap the non-folding areas NFA1 and NFA2, may have a thickness greater than a thickness of portions of the substrate SB, which overlap the groove patterns GP1 to GPn of the folding area FA1. Accordingly, the folding property of the window WM may be improved in the folding area FA1, and at substantially the same time, the window WM may have the impact resistance to protect the display module DM. As the filling member FR of the window WM is disposed in the groove patterns GP1 to GPn, the impact resistance of the window WM in the folding area FA1 may be compensated for.

FIG. 9C shows a cross-section of the display device DD that is outwardly folded (out-folding). In the display device DD outwardly folded, a window WM may be disposed to allow a lower surface SB-B of a substrate SB to face a display module DM. An upper surface SB-U of the substrate SB may face toward the outside. In the out-folding state, the lower surface SB-B of the substrate SB may face a folding axis FX and may surround the folding axis FX while being folded. For example, the lower surface SB-B of the substrate SB in the folding area FA1 may face the folding axis FX.

The window WM may further include a protective layer PL disposed on the substrate SB. For example, the protective layer PL may be disposed on the upper surface SB-U of the substrate SB to face a plurality of groove patterns GP. The protective layer PL may include a polymer film or a coating layer directly formed on the substrate SB to protect the substrate SB, however, the present invention is not necessarily limited thereto.

The protective layer PL may be integrally formed with a filling member FR, however, present invention is not necessarily limited thereto or thereby. According to an embodiment of the present invention, the protective layer PL may be formed through a separate process after the filling member FR is provided. In addition, the protective layer PL may be included in the window WM shown in FIGS. 9A and 9B and may be disposed on the lower surface SB-B of the substrate SB to protect the substrate SB. For example, the protective layer PL may be integrally formed with the window WM.

When the lower surface SB-B of the substrate SB faces the folding axis FX, the folding property of the window WM may be improved. For example, when the window WM is folded in the embodiments of the present invention shown in FIGS. 9A and 9C, the tensile stress is greatest at the upper surface SB-U of the substrate SB, and the compressive stress is greatest at the lower surface SB-B of the substrate SB. The portions of the substrate SB in which the groove patterns GP1 to GPn are formed may absorb the tensile stress better than the portions of the substrate SB in which the groove patterns GP1 to GPn are not formed and may have increased flexibility against the tensile stress.

Figure 10:
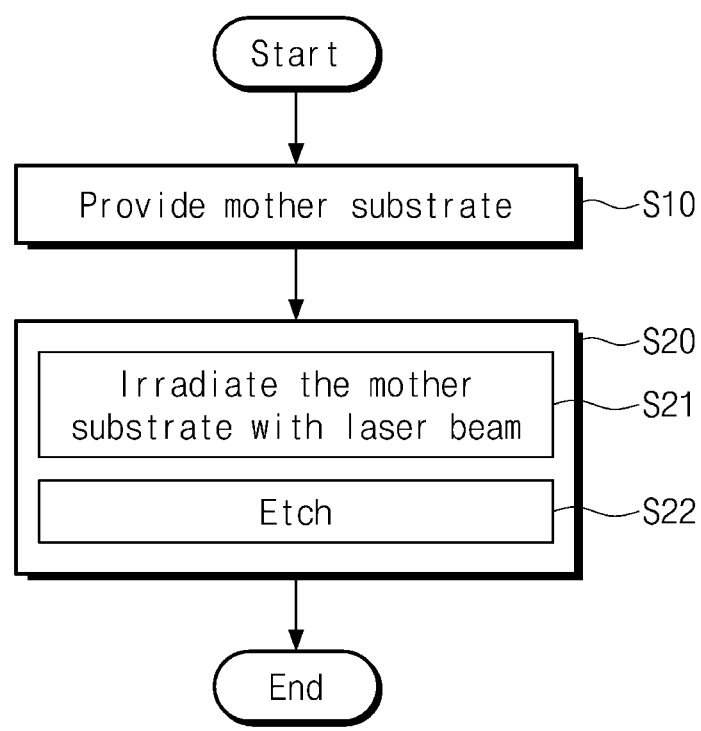
FIG. 10 is a flowchart illustrating a method of manufacturing a window according to an embodiment of the present invention.

FIG. 10 is a flowchart illustrating a method of manufacturing a window according to an embodiment of the present invention. Referring to FIG. 10, the manufacturing method of the window may include providing a mother substrate (S10) and forming groove patterns (S20).

The mother substrate provided in the providing of the mother substrate (S10) step may be used to manufacture the window and may correspond to a substrate in which no groove patterns are formed. The mother substrate provided in the providing of the mother substrate (S10) step may be, for example, a glass substrate that might not tempered or a glass substrate that is tempered according to its manufacturing state. Imaginary lines may be defined in the mother substrate along the direction, in which the groove patterns, which are to be formed on the mother substrate, extend.

Then, the groove patterns may be formed in the mother substrate (S20). The forming of the groove patterns (S20) may include irradiating the mother substrate with a laser beam (S21) and etching (S22).

The laser beam emitted in the irradiating of the mother substrate (S21) step may be emitted onto an irradiation point to change a refractive index of a portion of the mother substrate. The portion that is irradiated by the laser beam may be phase-transformed by the laser beam, and the refractive index of the portion that is irradiated by the laser beam may be different from a refractive index of a portion of the mother substrate that is not irradiated by the laser beam.

The etching (S22) may include wet-etching to provide an etchant to the portion that is irradiated by the laser beam. For example, as a method of providing the etchant, a spraying method that sprays the etchant to the portion of the mother substrate that is irradiated by the laser beam may be used, or a dipping method that dips the mother substrate into the etchant may be used, however, the present invention is not necessarily limited thereto. According to an embodiment of the present invention, the etchant may include an alkaline solution.

In addition, the manufacturing method of the window will be described in detail with reference to accompanying drawings.

Figure 11A:
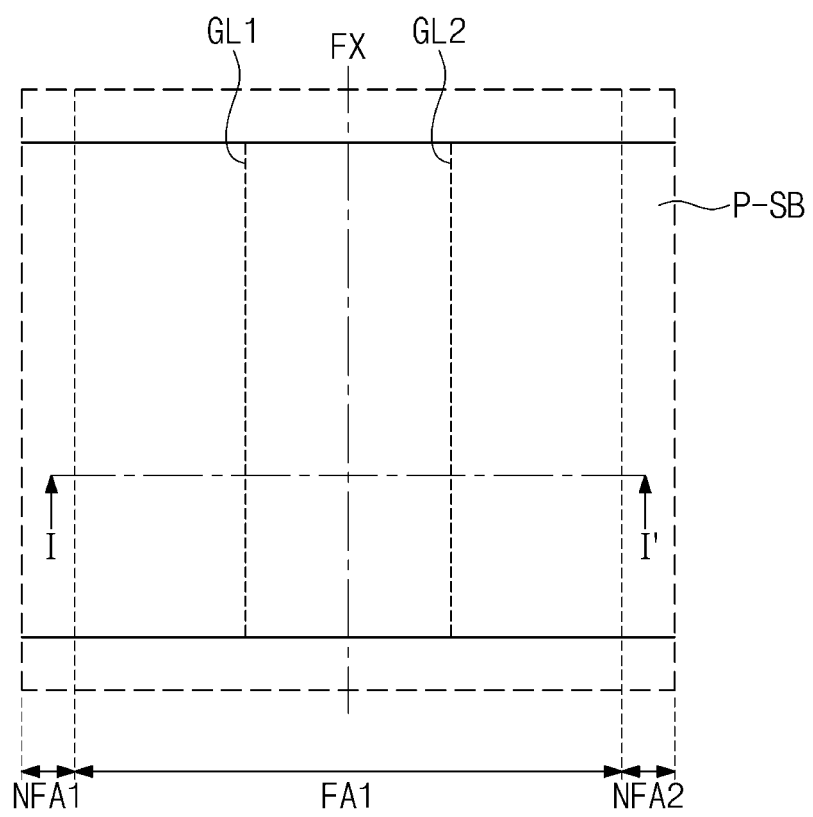
FIG. 11A is a plan view illustrating a process of a method of manufacturing a window according to an embodiment of the present invention.
Figure 11B:
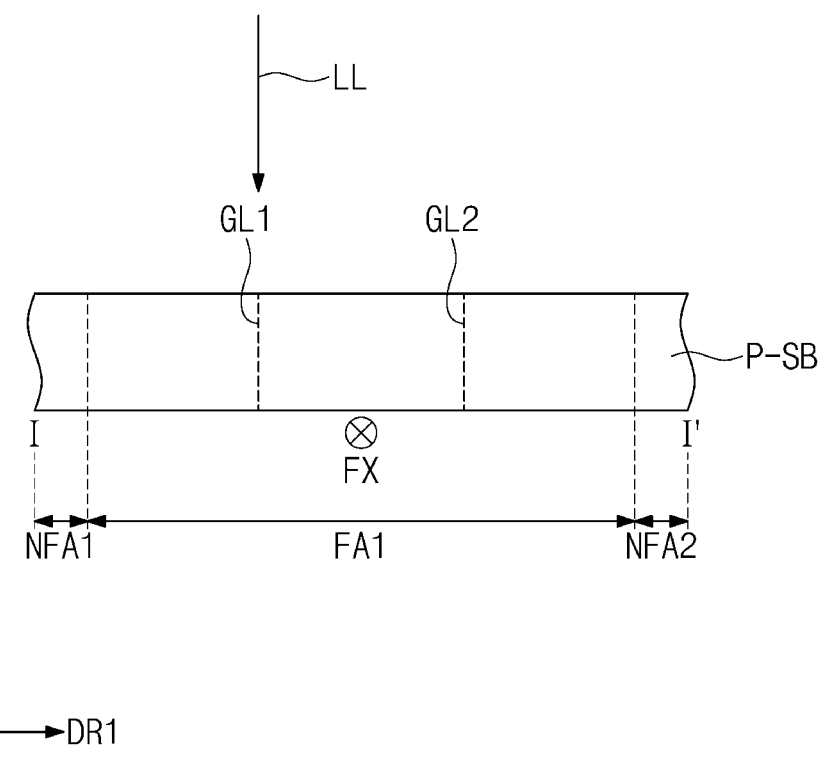
FIG. 11B is a cross-sectional view illustrating a process of a method of manufacturing a window according to an embodiment of the present invention.
Figure 12A:
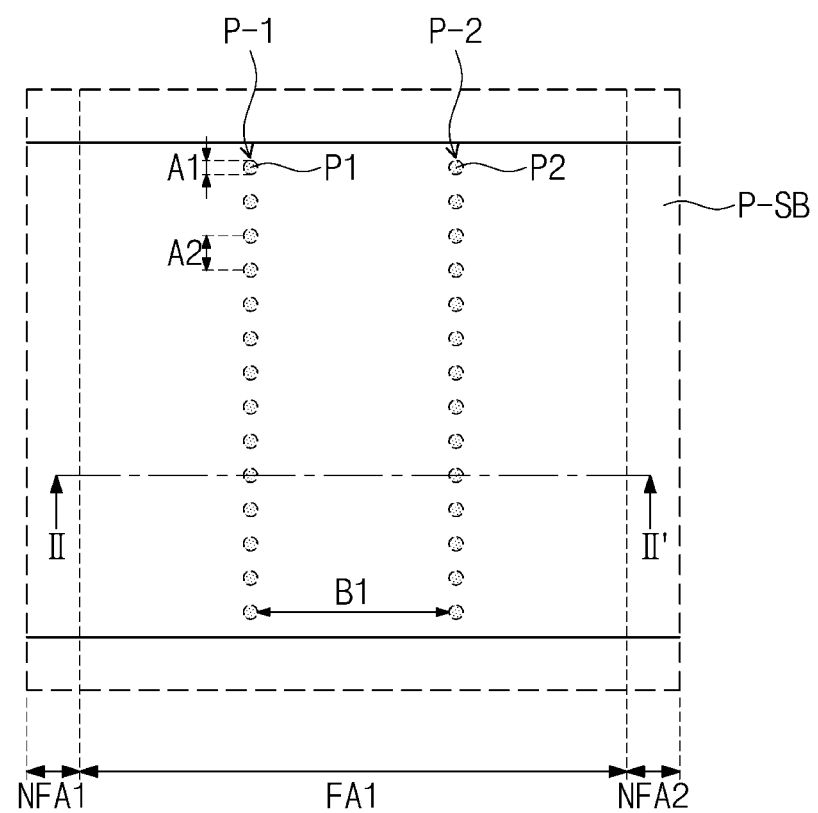
FIG. 12A is a plan view illustrating a process of a method of manufacturing a window according to an embodiment of the present invention.
Figure 12A:
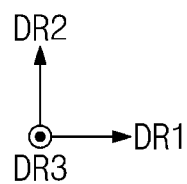
Figure 12B:
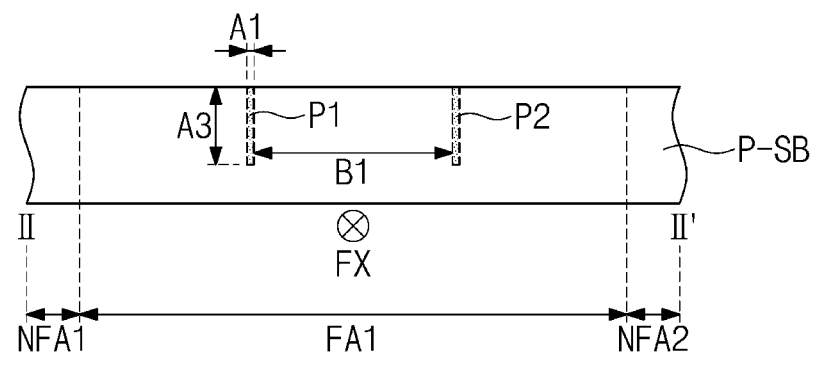
FIG. 12B is a cross-sectional view illustrating a process of a method of manufacturing a window according to an embodiment of the present invention.
Figure 12B:
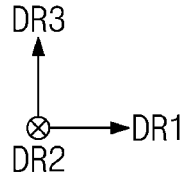
Figure 13A:
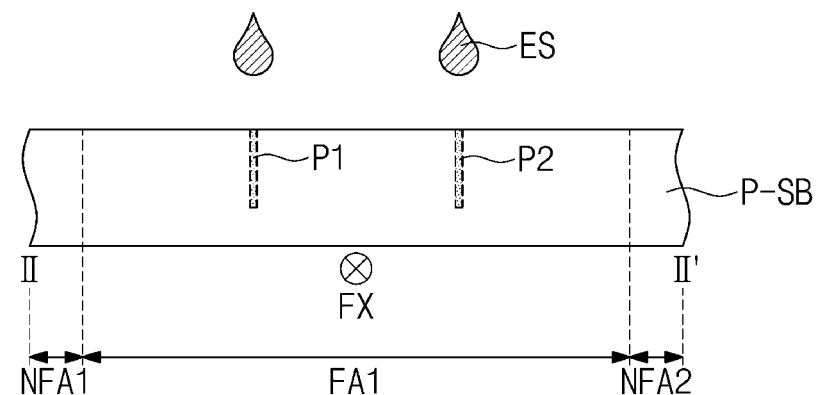
FIGS. 13A, 13B and 13C are cross-sectional views illustrating a process of a method of manufacturing a window according to an embodiment of the present invention.
Figure 13B:
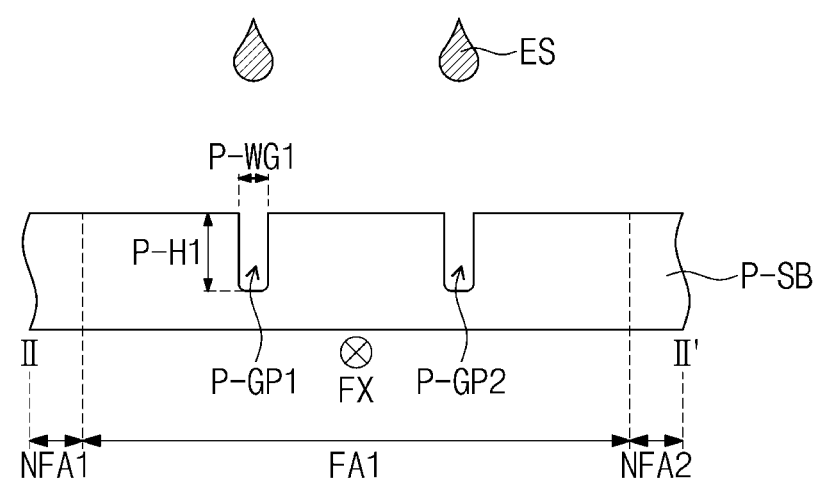
Figure 13C:
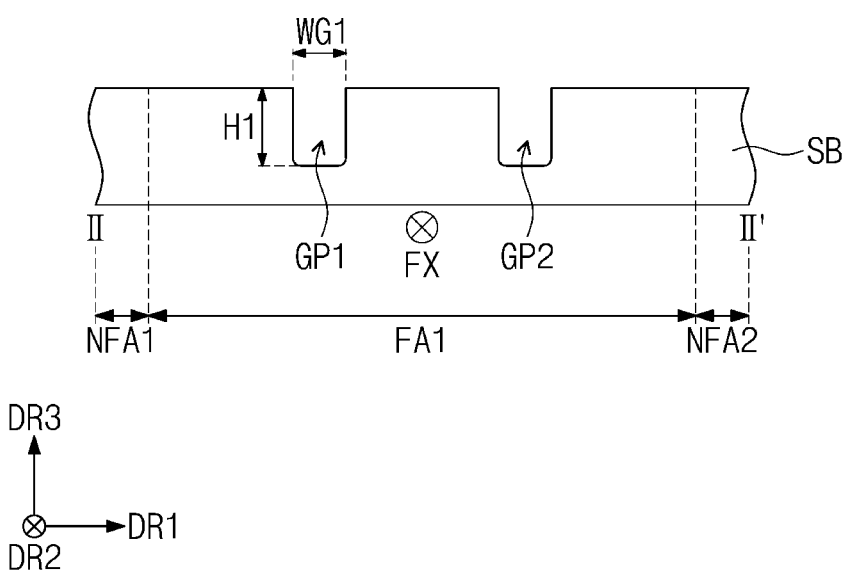

FIGS. 11A and 12A are plan views illustrating processes of the manufacturing method of the window according to embodiments of the present invention. FIGS. 11B and 12B are cross-sectional views illustrating processes of the manufacturing method of the window according to embodiments of the present invention. FIGS. 13A to 13C are cross-sectional views illustrating processes of the manufacturing method of the window according to embodiments of the present invention.

The plan view shown in FIG. 11A corresponds to the providing of the mother substrate (S10) step of FIG. 10, and a plan view of the provided mother substrate P-SB is shown as a representative example. Imaginary lines GL1 and GL2 may be defined in the folding area FA1 of the mother substrate P-SB to form the groove patterns. The imaginary lines GL1 and GL2 may correspond to center lines (e.g., imaginary center lines) of the groove patterns formed later and may be substantially parallel to a direction in which the groove patterns, which are formed later, extend.

For the convenience of explanation, FIG. 11A shows the imaginary lines GL1 and GL2 defined to form two groove patterns extending parallel to the folding axis FX as a representative example. The imaginary lines GL1 and GL2 may be defined to respectively correspond to the groove patterns that are to be formed, and the imaginary lines will be referred to as a first line GL1 and a second line GL2, respectively.

FIG. 11B is a cross-sectional view taken along a line I-I' shown in FIG. 11A. The process shown in FIG. 11B may correspond to the irradiating of the mother substrate with the laser beam (S21) step of FIG. 10.

The laser beam LL may be emitted to the mother substrate P-SB toward a thickness direction of the mother substrate P-SB. The laser beam LL may be emitted on a plurality of points overlapping the first and second lines GL1 and GL2.

At the points irradiated with the laser beam LL, a local melting occurs by the laser beam LL, and the phase of the mother substrate P-SB corresponding to the points irradiated with the laser beam LL may be changed. Thus, the refractive index may be changed. The refractive index of the points irradiated with the laser beam LL may be different from the refractive index of the mother substrate P-SB prior to being irradiated by the laser beam LL. The laser beam LL may have an intensity such that the refractive index of a portion of the mother substrate P-SB is changed without cutting the portion of the mother substrate P-SB.

For example, the laser beam LL may have a pulse energy. For example, a pulse duration of the laser beam LL may be in a range from hundreds of picoseconds to tens of femtoseconds. For example, the pulse duration of the laser beam LL may be substantially equal to or smaller than about 200 picoseconds. The pulse duration of the laser beam LL may vary depending on a material or thickness of the mother substrate P-SB. For example, the laser beam LL may have a wavelength substantially equal to or greater than about 250 nm and substantially equal to or smaller than about 1500 nm. For example, the laser beam LL may have a wavelength substantially equal to or greater than about 340 nm and substantially equal to or smaller than about 1060 nm.

The laser beam LL may be a non-diffractive beam. For example, the laser beam LL may be a Bessel beam, however, the present invention is not necessarily limited thereto or thereby. According to an embodiment of the present invention, the laser beam LL may be a Gaussian beam.

FIG. 12A is a plan view showing the mother substrate P-SB after the irradiation of the laser beam. For the convenience of explanation, portions P1 and P2 irradiated with the laser beam are shown hatched, however, the portions P1 and P2 irradiated with the laser beam are so minute that it may be difficult to identify the portions with naked eyes.

Referring to FIG. 12A, the laser beam LL (refer to FIG. 11B) may be emitted onto a plurality of portions P1 (hereinafter, referred to as first portions P1) overlapping the first line GL1 and spaced apart from each other in the second direction DR2 to form the first groove pattern. Similarly, the laser beam may be emitted onto a plurality of portions P2 (hereinafter, referred to as second portions P2) overlapping the second line GL2 and spaced apart from each other in the second direction DR2 to form the second groove pattern. A refractive index of the first portions P1 and the second portions P2 after the irradiation by the laser beam may be different from a refractive index of the mother substrate P-SB before the irradiation by the laser beam. Before the first and second groove patterns are formed, the first portions P1 and the second portions P2, which are irradiated by the laser beam, may be respectively defined as a first preliminary pattern P-1 and a second preliminary pattern P-2.

The first portions P1 may be formed to have a predetermined diameter A1 when viewed in a plane. For example, the diameter A1 of each of the first portions P1 may be substantially equal to or smaller than about 3 μm. The laser beam LL (refer to FIG. 11B) may change the refractive index of the portions without forming a physical hole in the mother substrate P-SB, and a size of the portions where the refractive index is changed is also relatively very small. Accordingly, changes in appearance of the mother substrate P-SB by the laser beam may not be easily seen and may be viewed using a high-magnification microscope.

The first portions P1 may be formed along the second direction DR2 and may be spaced apart from each other by a predetermined distance A2. Similarly, the second portions P2 may be formed along the second direction DR2 and may be spaced apart from each other by a predetermined distance. The distance A2 between the first portions P1 may be several micrometers (μm). For example, the distance A2 between the first portions P1 may be substantially equal to or smaller than about 5 μm and is not necessarily limited thereto.

The first portions P1 may be spaced apart from the second portions P2 in the first direction DR1 by a predetermined distance B1. A distance between the groove patterns GP1 and GP2 (refer to FIG. 13C) may be changed according to the distance B1 between the first portions P1 and the second portions P2 in the first direction DR1.

The first portions P1 may be formed to be spaced apart from each other, however, the first groove pattern GP1 (refer to FIG. 13C) integrally extending along the second direction DR2 may be formed through the etching (S22) step described later. Similarly, the second portions P2 may form the second groove pattern GP2 (refer to FIG. 13C) that is spaced apart from the first groove pattern GP1 (refer to FIG. 13C) in the first direction DR1 and extends in the second direction DR2 through the etching (S22).

FIG. 12B illustrates a cross-section of the mother substrate P-SB, which is taken along a line II-II' shown in FIG. 12A after the laser beam is emitted. For the convenience of explanation, the first portions P1 and the second portions P2 of which the refractive index is changed due to the irradiation by the laser beam are shown hatched in FIG. 12B and subsequent drawings.

Referring to FIG. 12B, each of the first portions P1 and the second portions P2 may have a predetermined thickness in the thickness direction. The thickness A3 of each of the first portions P1 may be smaller than the thickness of the mother substrate P-SB. The thickness A3 of the first portions P1 may be controlled by adjusting the intensity of the laser beam. A depth of the first groove pattern GP1 (refer to FIG. 13C) may be changed depending on the thickness A3 of the first portions P1.

When referring to one first portion among the first portions P1, multiple times of irradiation of one point by the laser beam is not required to form the first portion, and the refractive index of the mother substrate P-SB corresponding to the first portion may be changed by being irradiated by one laser beam, however, the present invention is not necessarily limited thereto or thereby.

Descriptions on the first portions P1 may be equally applied to the second portions P2. The second portions P2 may have substantially the same thickness as the thickness A3 of the first portions P1. In this case, a depth of the second groove pattern may be formed to be substantially the same as the depth of the first groove pattern when the etching (S22) step is applied to the second portions P2 under the same conditions.

FIGS. 13A to 13C illustrate cross-sectional views taken along a line II-II' shown in FIG. 12A. The process shown in FIGS. 13A to 13C may correspond to the etching (S22) step of FIG. 10.

Referring to FIG. 13A, the etchant ES may be provided on the first and second portions P1 and P2. The etchant ES may be provided by the spraying method or the dipping method, however, the present invention is not necessarily limited thereto. The etchant ES may etch a portion of the mother substrate P-SB around the first and second portions P1 and P2.

The etchant ES may include an alkaline solution. For example, the etchant ES may include a sodium hydroxide (NaOH) solution or a potassium hydroxide (KOH) solution. As the etchant ES includes the alkaline solution, for example, the groove patterns GP1 and GP2 may be formed to include the bottom surface, which is substantially parallel to the upper surface of the substrate, and the side surface, which includes at least one curved surface. For example, when the etchant includes an acid solution such as a hydrogen fluoride solution, a sharp groove pattern pointing downward to the lower surface of the mother substrate P-SB may be formed, and it may be difficult to form the groove pattern in the shape according to an embodiment of the present invention.

The shape of the groove patterns may be changed depending on an etch rate or an etch amount. As a concentration and a temperature of the etchant ES increase, the etch rate increases. As an exposure time to the etchant ES increases, for example, an etch time increases, the etch amount increases.

For example, as the temperature of the etchant ES increases, a reactivity of the etchant ES may increase, and thus, the etch rate may be increase. The temperature of the etchant ES may be equal to or higher than a room temperature. As an example, the temperature of the etchant ES may be substantially equal to or higher than about 100 Celsius degrees and substantially equal to or lower than about 150 Celsius degrees. When the temperature of the etchant ES is lower than about 100 Celsius degrees, the reactivity of the etchant ES may be deteriorated, and a process time required to form the groove pattern may increase. When the temperature of the etchant ES is higher than about 150 Celsius degrees, the mother substrate P-SB may be damaged since the mother substrate P-SB is exposed to the high temperature.

FIG. 13B illustrates the cross-sectional view of the mother substrate P-SB after a predetermined time elapses since the providing of the etchant ES. FIG. 13C illustrates the cross-sectional view of the substrate SB in which the groove patterns GP1 and GP2 are formed after the exposure time to the etchant ES is lengthened in the state shown in FIG. 13B.

Referring to FIG. 13B, the mother substrate P-SB may be isotropically etched around the first portions P1 and the second portions P2. The first portions P1 may be etched to form a first recessed portions P-GP1, and the second portions P2 may be etched to form a second recessed portions P-GP2. Due to the etchant ES including the alkaline solution, the first and second recessed portions P-GP1 and P-GP2 may be formed to include the bottom surface and at least one curved surface. The bottom surface may be substantially parallel to the upper surface of the mother substrate P-SB, and the at least one curved surface may be bent from the bottom surface.

The first recessed portion P-GP1 may be formed to have a predetermined width P-WG1 in the first direction DR1 and a predetermined depth P-H1 in the third direction DR3. The first recessed portion P-GP1 may be controlled by the size of the first portions P1, the arrangement of the first portions P1, the etch time in the etching process, and/or the like. For example, the width P-WG1 of the first recessed portion P-GP1 may vary depending on the diameter A1 (refer to FIG. 12B) of the first portions P1. The depth P-H1 of the first recessed portion P-GP1 may vary depending on the thickness A3 (refer to FIG. 12B) of the first portions P1. Descriptions on the first recessed portion P-GP1 may be applied to the second recessed portion P-GP2.

In a case where the etching (S22) step is terminated in the state shown in FIG. 13B, the first recessed portion P-GP1 and the second recessed portion P-GP2 may correspond to the first groove pattern and the second groove pattern, respectively. In a case where the etching (S22) step is performed by extending the etch time in the state shown in FIG. 13B, the first groove pattern and the second groove pattern may correspond to the state shown in FIG. 13C.

Referring to FIG. 13C, the groove patterns GP1 and GP2 may be formed by recessing portions of the substrate SB through the emission of the laser beam (S21) and the etching (S22). In this case, the substrate SB may correspond to the mother substrate P-SB in which the groove patterns GP1 and GP2 are formed. Descriptions on the groove patterns GP1 and GP2 are the same as those described above.

The first groove pattern GP1 may have the width WG1 and the depth H1. The first recessed portion P-GP1 of FIG. 13B may be further exposed to the etchant ES to be formed as the first groove pattern GP1. The width WG1 of the first groove pattern GP1 may be greater than the width P-WG1 of the first recessed portion P-GP1. In addition, the depth H1 of the first groove pattern GP1 may be greater than the depth P-H1 of the first recessed portion P-GP1. Accordingly, the etch amount may be controlled by adjusting the etch time, and thus, the groove patterns having desired width and depth may be formed. The above descriptions on the first groove pattern GP1 may be applied to the second groove pattern GP2.

The manufacturing method of the window according to an embodiment of the present invention may further include forming the groove patterns having different widths according to the shape of the groove patterns included in the window. Hereinafter, processes of forming the groove patterns having different widths from each other will be described in detail with reference to accompanying drawings.

Figure 14:
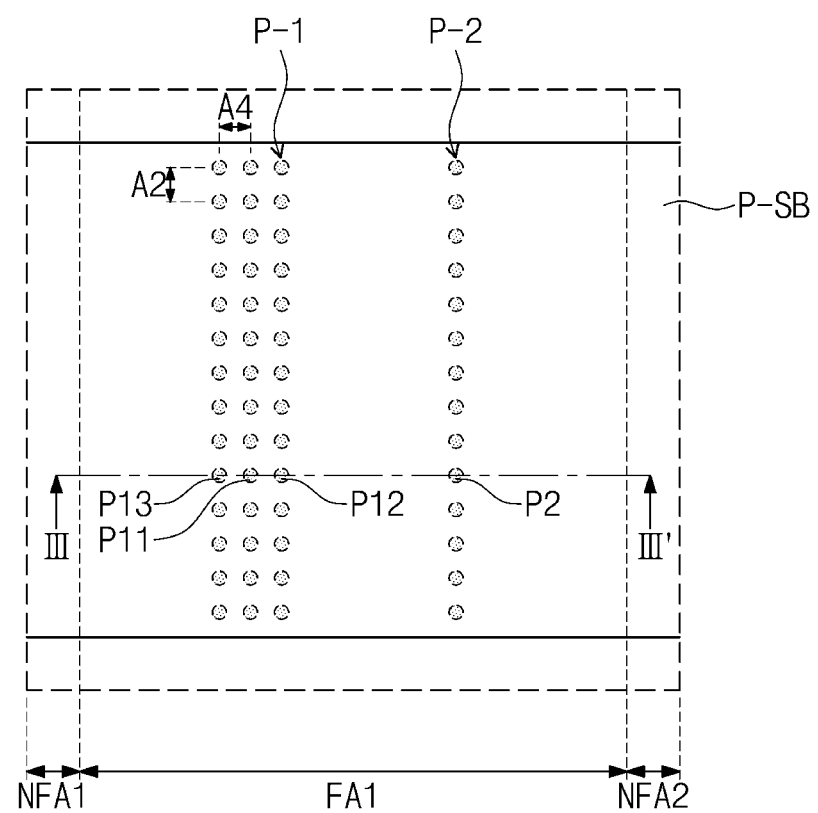
FIG. 14 is a plan view illustrating a process of a method of manufacturing a window according to an embodiment of the present invention.
Figure 15A:
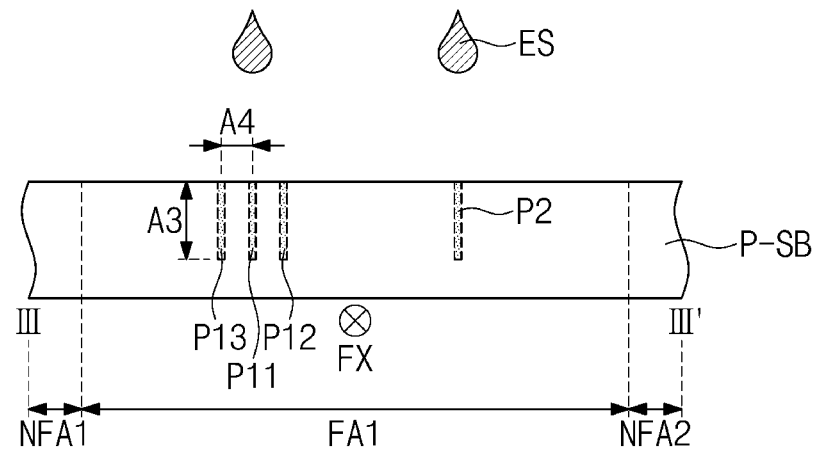
FIGS. 15A and 15B are cross-sectional views illustrating a process of a method of manufacturing a window according to an embodiment of the present invention.
Figure 15B:
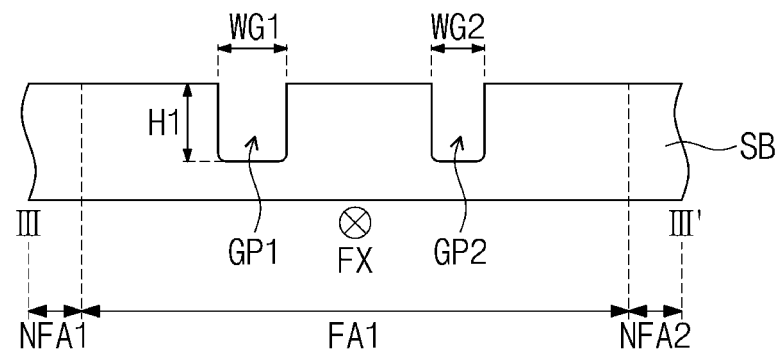
Figure 15B:
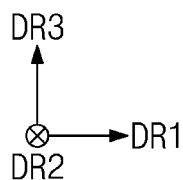
Figure 16A:
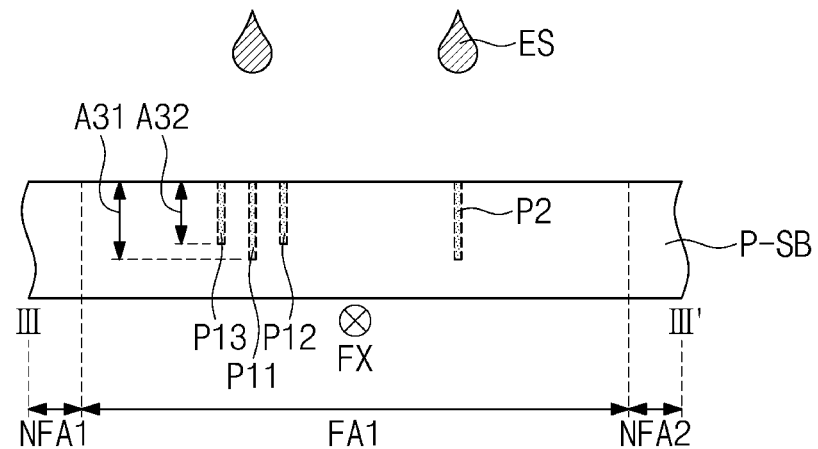
FIGS. 16A and 16B are cross-sectional views illustrating a process of a method of manufacturing a window according to an embodiment of the present invention.
Figure 16B:
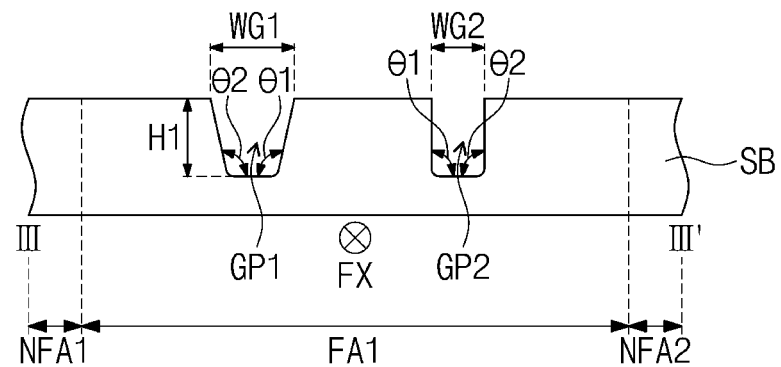
Figure 17A:
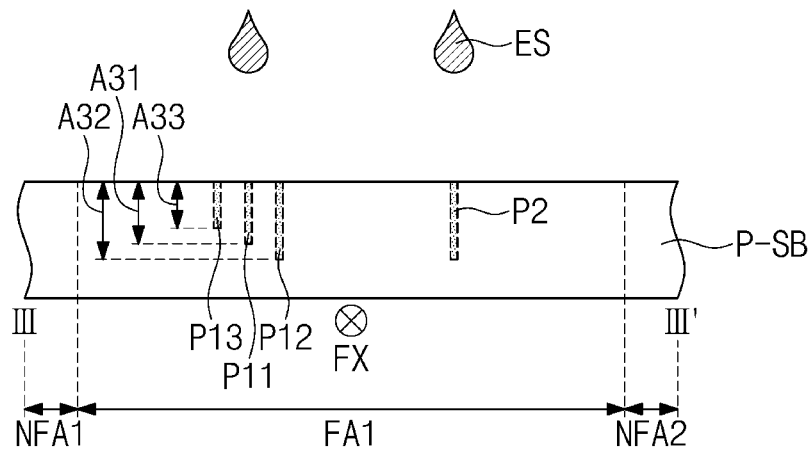
FIGS. 17A and 17B are cross-sectional views illustrating a process of a method of manufacturing a window according to an embodiment of the present invention.

FIG. 14 is a plan view showing a process of the manufacturing method of the window according to an embodiment of the present invention. FIGS. 15A, 15B, 16A, 16B, 17A, and 17B are cross-sectional views showing processes of the manufacturing method of the window according to embodiments of the present invention. Descriptions on an etchant ES used in the etching (S22) step shown in FIGS. 15A, 16A, and 17A are the same as those described above.

FIG. 14 shows the plan view of a mother substrate P-SB after being irradiated by the laser beam to form the groove patterns having different widths from each other. In FIG. 14, portions P11, P12, P13, and P2, which are irradiated by the laser beam, are shown hatched.

Referring to FIG. 14, the laser beam may be emitted onto portions of the mother substrate P-SB spaced apart from each other in the second direction DR2 to form the second groove pattern, and the second portions P2 may be formed. Descriptions on the forming of the second portions P2 are the same as those described above.

The laser beam may be emitted onto portions of the mother substrate P-SB, which arranged in the first direction DR1 and the second direction DR2 and spaced apart from each other, to form the first groove pattern having the width greater than that of the second groove pattern, and first portions P11, P12, and P13 may be formed as shown in FIG. 14. Accordingly, the mother substrate P-SB may be irradiated by the laser beam to form the first portions P11, P12, and P13, which are arranged in a matrix form along a direction in which the groove pattern extends and a direction in which the width of the groove pattern extends, and thus, the groove pattern having the greater width is formed.

The first portions P11, P12, and P13 may be formed to be spaced apart from each other by a predetermined distance A4 in the first direction DR1. The distance A4, which is between the first portions P11, P12, and P13, extends in the first direction DR1 and may be several micrometers (μm). The width of the first groove pattern formed around the first portions P11, P12, and P13 may be changed depending on the number of the first portions P11, P12, and P13 formed along the first direction DR1 and the distance A4 between the first portions P11, P12, and P13.

The first portions P11, P12, and P13 are formed to be spaced apart from each other, however, the first portions P11, P12, and P13 are integrally connected along the first direction DR1 and the second direction DR2 through the etching (S22) step to form the first groove pattern. In addition, the arrangement of the first portions P11, P12, and P13 shown in FIG. 14 is merely one example and may be changed depending on the shape and the size of the groove pattern.

FIG. 15A is a cross-sectional view taken along a line III-III' shown in FIG. 14 in the etching (S22) step. FIG. 15B is a cross-sectional view showing the substrate SB after the etching (S22) step shown in FIG. 15A is completed.

Referring to FIGS. 15A and 15B, each of the first portions P11, P12, and P13 and the second portions P2 of which the refractive index is changed by the laser beam may have a predetermined thickness along the thickness direction. The first portions P11, P12, and P13 arranged in the first direction DR1 may have substantially the same thickness A3. In this case, as shown in FIG. 15B, the first groove pattern GP1 formed from the first portions P11, P12, and P13 may be formed to have a side surface with a slope that is substantially perpendicular to a bottom surface.

The width WG1 of the first groove pattern GP1 may vary depending on a diameter of each of the first portions P11, P12, and P13, a distance between the first portions P11, P12, and P13 spaced apart from each other in the first direction DR1, and the number of the first portions P11, P12, and P13 formed in the first direction DR1. The width WG1 of the first groove pattern GP1 formed by the first portions P11, P12, and P13, which are three columns arranged along the first direction DR1, may be greater than the width WG2 of the second groove pattern GP2 formed by the second portions P2, which is one column spaced apart from the first portions P11, P12, and P13 along the first direction DR1.

The second portions P2 may have substantially the same thickness as the thickness A3 of each of the first portions P11, P12, and P13. In this case, the depth of the second groove pattern GP2 may be formed to be substantially the same as the depth H1 of the first groove pattern GP1 when the etching (S22) step is applied to the second groove pattern GP2 under the same conditions.

FIG. 16A is a cross-sectional view of FIG. 14 along a line III-III' illustrating the etching (S22) step. FIG. 16B is a cross-sectional view illustrating the substrate SB after the etching (S22) step shown in FIG. 16A is completed.

Referring to FIG. 16A, some portions of the first portions P11, P12, and P13 may have different thicknesses from the other portions of the first portions P11, P12, and P13. The slope of the side surface of the groove pattern may be controlled by adjusting the thickness of each of the first portions P11, P12, and P13. The thickness of each of the first portions P11, P12, and P13 may be controlled by adjusting the intensity of the laser beam. For example, among the first portions P11, P12, and P13, first portions P11, which are formed at a center position, may have a first thickness A31, and first portions P12 and P13, which are respectively formed at right and left positions with respect to each of the first portions P11, may have a second thickness A32 smaller than the first thickness A31.

Referring to FIG. 16B, as the first portions P12 and P13 on both sides of the first portions P11, which is formed between the first portions P12 and P13, are formed to have a relatively small thickness, the first groove pattern GP1 may be formed to allow the portions of the side surface facing each other to be inclined at an angle greater than about 90 degrees with respect to the bottom surface. As the first portions P12 and P13 on both sides of each of the first portions 11 are formed to have the same thickness as each other, the portions of the side surface of the first groove pattern GP1, which face each other, may be inclined at the same angles Θ1 and 02 as each other. This may correspond to the groove pattern GPa described with reference to FIG. 5B.

The angles Θ1 and Θ2 of the side surface of the first groove pattern GP1 may be different from the angles Θ1 and Θ2 of the side surface of the second groove pattern GP2. The width WG1 of the first groove pattern GP1 including the side surface inclined at the angle greater than that of the second groove pattern GP2 may be greater than the width WG2 of the second groove pattern GP2.

The thickness of the second portions P2 may be substantially the same as the first thickness A31, which is the greatest thickness among the thicknesses of the first portions P11, P12, and P13. In this case, the depth of the second groove pattern GP2 may be formed to be substantially the same as the depth H1 of the first groove pattern GP1 when the etching (S22) step is applied to the second groove pattern GP2 under substantially the same conditions.

Figure 17B:
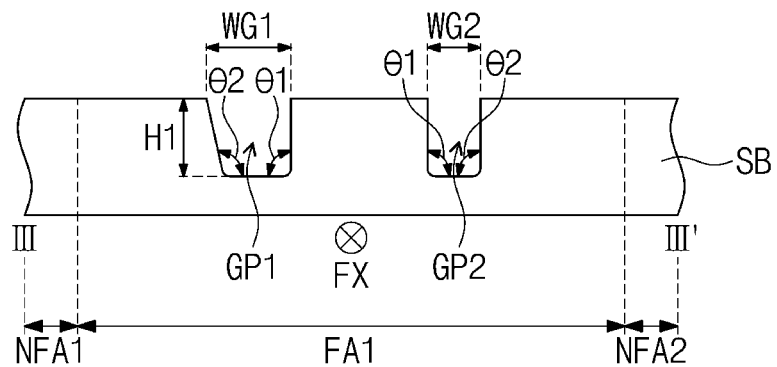

FIG. 17A is a cross-sectional view of FIG. 14 along a line III-III' illustrating in the etching (S22) step according to an embodiment of the present invention. FIG. 17B is a cross-sectional view illustrating the substrate SB after the etching (S22) step shown in FIG. 17A is completed.

Referring to FIG. 17A, some portions of the first portions P11, P12, and P13 may be formed to have different thicknesses from the other portions of the first portions P11, P12, and P13, and the embodiment shown in FIG. 17A has some differences from the embodiment described with reference to FIG. 16A. For example, the first portions P11, P12, and P13 may respectively have thicknesses A31, A32, and A33 that decrease from right to left. A second thickness A32 of the first portions P12 formed at the rightmost position, with respect to the first portions P11 and P13, may be the greatest thickness among the thicknesses of the first portions P11, P12, and P13, and a third thickness A33 of the first portions P13 formed at the leftmost position, with respect to the first portions P11 and P12, may be the smallest thickness among the thicknesses of the first portions P11, P12, and P13.

Referring to FIG. 17B, as the thickness of the first portions P11, P12, and P13 is formed to gradually decrease along one direction (along a direction opposite to the first direction DR1), the first groove pattern GP1 may be formed to allow the slope of portions of the side surfaces facing each other to be different from each other with respect to the bottom surface. A first surface of the side surface of the first groove pattern GP1 may be inclined at a first angle Θ1. A second surface facing the first surface in the first direction DR1 may be inclined at a second angle Θ2, and the first angle Θ1 and the second angle Θ2 may be different from each other. For example, the first angle Θ1 may be substantially the same as about 90 degrees, and the second angle Θ2 may be greater than about 90 degrees. This may correspond to the groove pattern GPb described with reference to FIG. 5C. Accordingly, the first angle Θ1 and the second angle Θ2 of the first groove pattern GP1 may vary depending on the thicknesses of the first portions P11, P12, and P13.

The angles Θ1 and 02 of the side surface of the first groove pattern GP1 may be the same as or may be different from the angles Θ1 and Θ2 of the side surface of the second groove pattern GP2. For example, the first angle Θ1 of the first groove pattern GP1 may be substantially the same as the first angle Θ1 of the second groove pattern GP2, and the second angle Θ2 of the first groove pattern GP1 may be different from the second angle Θ2 of the second groove pattern GP2. These may vary depending on the thicknesses of each of and/or arrangement of the first portions P11, P12, and P13 and the second portions P2.

The width WG1 of the first groove pattern GP1 including the side surface, which is inclined at an angle greater than that of the second groove pattern GP2, may be greater than the width WG2 of the second groove pattern GP2. The thickness of the second portions P2 may be substantially the same as the second thickness A32 that is the greatest thickness of the thicknesses of the first portions P11, P12, and P13. In this case, the depth of the second groove pattern GP2 may be formed to be substantially the same as the depth H1 of the first groove pattern GP1 when the etching (S22) step is applied to the second groove pattern GP2 under substantially the same conditions.

As the window includes the groove patterns recessed from the upper surface thereof in the folding area, the window may have increased impact resistance, and the flexibility may be increased. The groove patterns may include the bottom surface and the side surface. The bottom may be parallel to the upper surface, and the side surface may include the curved surface. Thus, the stress caused by the folding operation may be dispersed. As a result, the folding property of the window may be improved.

As the window has increased impact resistance, the window may be disposed on the display module and may protect the display module from the external impacts. The window may have the improved folding property, and thus, the display device may be prevented from being damaged due to the repeat folding operation. The window may improve a phenomenon of interference fringes caused by the groove patterns and the pixels of the display module that are visually recognized.

According to the manufacturing method of the window, the groove patterns including the bottom surface parallel to the upper surface of the substrate and the side surface including the curved surface may be formed. Accordingly, the window having the increased impact resistance and the improved folding property may be manufactured by the manufacturing method of the window. In addition, the groove patterns including the side surfaces having different slopes may be formed by the manufacturing method of the window, and thus, the window having increased visibility may be manufactured.

While the present invention has been described with reference to embodiments thereof, it will be understood by those of ordinary skill in the art that various changes in form and details may be made thereto without departing from the spirit and scope of the present invention.

What is claimed is:

1. A window comprising:
a substrate comprising a folding area, a non-folding area, an upper surface, and a lower surface, wherein the folding area is configured to fold about a folding axis; and
a plurality of groove patterns arranged in the folding area along a first direction crossing the folding axis, wherein each of the plurality of groove patterns comprises:
a bottom surface recessed from the upper surface of the substrate and substantially parallel to the upper surface of the substrate; and
a side surface, wherein each side surface of the plurality of groove patterns connects each bottom surface of the plurality of groove patterns to the upper surface of the substrate, and wherein the side surface comprises at least one curved surface.

2. The window of claim 1, wherein each of the side surfaces of the plurality groove patterns, when the substrate is in a non-folded state, comprises:
a first surface; and
a second surface facing the first surface and more spaced apart from the folding axis in the first direction than the first surface is, and
wherein the first surface is inclined at a first angle with respect to the bottom surface, wherein the second surface is inclined at a second angle with respect to the bottom surface, and wherein each of the first angle and the second angle is equal to or greater than about 90 degrees and is equal to or smaller than about 140 degrees.

3. The window of claim 2, wherein the first angles of each of the plurality of groove patterns are substantially the same as each other.

4. The window of claim 2, wherein the plurality of groove patterns comprise two or more groove patterns having different the first angles from each other.

5. The window of claim 2, wherein the second angles of each of the plurality of groove patterns are substantially the same as the first angles respectively facing the second angles.

6. The window of claim 2, wherein at least one second angle of the second angles of the plurality of groove patterns are different from the first angles of the plurality of groove patterns.

7. The window of claim 2, wherein the second angles of the plurality of groove patterns decrease as a distance between a groove pattern of the plurality of groove patterns and the folding axis decreases.

8. The window of claim 1, wherein thicknesses from the lower surface of the substrate to the bottom surfaces of each of the plurality of groove patterns are the same as each other.

9. The window of claim 1, wherein thicknesses from the lower surface of the substrate to the bottom surfaces of each of the plurality of groove patterns are equal to or greater than about 1 micrometer (μm) and equal to or smaller than about 30 micrometer (μm).

10. The window of claim 1, wherein the bottom surfaces of each of the plurality of groove patterns have a width equal to or greater than about 4 μm.

11. The window of claim 1, wherein the plurality of groove patterns are symmetrical with respect to the folding axis.

12. The window of claim 1, wherein the plurality of groove patterns comprise a mesh pattern.

13. The window of claim 1, wherein the lower surface of the substrate faces the folding axis when the substrate is in a folded state.

14. The window of claim 1, further comprising a filling member disposed in the plurality of groove patterns.

15. A display device comprising:
a display module configured to fold and un-fold; and
a window disposed on the display module and configured to fold and un-fold, wherein the window includes:
a substrate comprising a folding area, a non-folding area, an upper surface, and a lower surface, wherein the folding area is configured to fold about a folding axis; and
a plurality of groove patterns arranged in the folding area along one direction crossing the folding axis, wherein each of the plurality of groove patterns comprises:
a bottom surface recessed from the upper surface of the substrate and substantially parallel to the upper surface of the substrate; and
a side surface, wherein each side surface of the plurality of groove patterns connects each bottom surface of the plurality of groove patterns to the upper surface of the substrate, and wherein the side surface comprises at least one curved surface.

16. A method of manufacturing a window, comprising:
providing a mother substrate in which a first line extending in a first direction is for forming a first groove pattern; and
forming the first groove pattern in areas of the mother substrate, wherein the forming of the first groove pattern comprises:
irradiating, with a first laser beam, first portions, of the mother substrate, overlapping the first line; and
providing an alkaline solution onto the first portions of the mother substrate to etch the first portions, and
wherein a refractive index of the first portions irradiated with the first laser beam is different from a refractive index of the mother substrate before being irradiated by the first laser beam, and the first portions irradiated with the first laser beam have a thickness smaller than a thickness of a second portion of the mother substrate not irradiated by the first laser beam.

17. The method of claim 16, further comprising forming a second groove pattern, wherein the forming of the second groove pattern comprises:
providing a second line spaced apart from the first line and extending in the first direction on the mother substrate to form the second groove pattern;
irradiating, with a second laser beam, third portions and fourth portions of the mother substrate, wherein the third portions overlap the second line, and wherein the fourth portions are spaced apart from the third portions in a second direction crossing the first direction; and
providing the alkaline solution onto the third portions and the fourth portions to etch the third portions and the fourth portions, and
wherein the third and fourth portions irradiated with the second laser beam have a refractive index different from the refractive index of the second portion of the mother substrate not irradiated by the second laser beam, wherein the third and fourth portions irradiated with the second laser beam have a thickness smaller than the thickness of the second portion of the mother substrate not irradiated by the second laser beam, and the second groove pattern has a width greater than a width of the first groove pattern in the second direction.

18. The method of claim 17, wherein the thickness of the third portions is substantially the same as the thickness of the fourth portions.

19. The method of claim 17, wherein the thickness of the third portions is different from the thickness of the fourth portions.

20. The method of claim 16, wherein the alkaline solution has a temperature equal to or greater than about 100 Celsius degrees and equal to or smaller than about 150 Celsius degrees.

* * * * *